(12) United States Patent
Lyu

(10) Patent No.: US 11,414,179 B2
(45) Date of Patent: Aug. 16, 2022

(54) FOILS WITH SERRATIONS

(71) Applicant: Benshuai Lyu, Beijing (CN)

(72) Inventor: Benshuai Lyu, Beijing (CN)

( * ) Notice: Subject to any disclaimer, the term of this patent is extended or adjusted under 35 U.S.C. 154(b) by 0 days.

(21) Appl. No.: 17/324,974

(22) Filed: May 19, 2021

(65) Prior Publication Data

US 2022/0119097 A1    Apr. 21, 2022

Related U.S. Application Data

(63) Continuation of application No. PCT/GB2019/053266, filed on Nov. 19, 2019.

(30) Foreign Application Priority Data

Nov. 19, 2018 (GB) ..................................... 1818839

(51) Int. Cl.
*B64C 21/10* (2006.01)
*F03D 1/06* (2006.01)
(Continued)

(52) U.S. Cl.
CPC .............. *B64C 21/10* (2013.01); *B63B 1/248* (2013.01); *B64C 3/14* (2013.01); *B64C 11/18* (2013.01);
(Continued)

(58) Field of Classification Search
CPC .......... F01D 5/14; F01D 5/141; F03D 1/0633; F03D 1/0675; B64C 3/14; B64C 11/16;
(Continued)

(56) References Cited

U.S. PATENT DOCUMENTS 5,088,665 A    2/1992  Vijgen et al.
2014/0377077 A1*  12/2014  Gruber ................... F01D 5/141
                                                                416/228
(Continued)

FOREIGN PATENT DOCUMENTS

CN        108131239      6/2018
EP          1752649      2/2007
(Continued)

OTHER PUBLICATIONS

International Search Report issued for International Patent Application No. PCT/GB2019/053266, dated Feb. 4, 2020, 4 pages.
Narayanan, S. et al., "Airfoil noise reductions through leading edge serrations," Physics of Fluids, vol. 27, 2015, 35 pages.

*Primary Examiner* — Brian P Wolcott
*Assistant Examiner* — Sang K Kim
(74) *Attorney, Agent, or Firm* — Hamre, Schumann, Mueller & Larson, P.C.

(57) ABSTRACT

A foil, such as an aerofoil, having a leading edge and a trailing edge, of which at least a portion of one or both of the leading edge and trailing edge has a serrated profile comprising a plurality of adjoining teeth, each tooth having a tip point that represents a local maximum chord-wise extent of the tooth and, on each side span-wise of the tip point, a root point that represents a local minimum chord-wise extent of the tooth and at which the tooth adjoins a respective adjacent tooth, wherein the tooth edge profile varies with an ogee-like curve between tip point and root point such that the tooth is sharper in the neighbourhood of the tip point and in the neighbourhood of the root point than at locations in between.

31 Claims, 17 Drawing Sheets

(51) Int. Cl.
   *B64C 11/18* (2006.01)
   *B64C 3/14* (2006.01)
   *F01D 5/14* (2006.01)
   *B63B 1/24* (2020.01)

(52) U.S. Cl.
   CPC ........... *F01D 5/141* (2013.01); *F03D 1/0675* (2013.01); *B64C 2003/146* (2013.01); *B64C 2003/147* (2013.01); *F05B 2260/96* (2013.01); *F05D 2220/31* (2013.01); *F05D 2260/96* (2013.01)

(58) Field of Classification Search
   CPC ......... B64C 11/18; B64C 11/20; B64C 21/10; B64C 2003/146; B64C 2003/147; F04D 29/324; F04D 29/34; F04D 29/38; F04D 29/384; F04D 29/544; B63B 1/248; F05B 2260/96; F05B 2220/31
   See application file for complete search history.

(56) References Cited

U.S. PATENT DOCUMENTS

| | | |
|---|---|---|
| 2015/0329200 A1 | 11/2015 | Barrett |
| 2016/0052621 A1 | 2/2016 | Ireland et al. |
| 2017/0022820 A1* | 1/2017 | Joseph .................... F01D 5/141 |
| 2017/0174320 A1* | 6/2017 | Beckman ................ B64C 23/06 |
| 2017/0241278 A1* | 8/2017 | Paruchuri ................. B64C 3/14 |
| 2020/0040736 A1* | 2/2020 | Teramoto .............. F04D 29/661 |
| 2021/0388725 A1* | 12/2021 | Gea Aguilera ......... B64C 21/00 |

FOREIGN PATENT DOCUMENTS

| | | |
|---|---|---|
| EP | 3208420 | 8/2017 |
| WO | 2018179075 | 10/2018 |

* cited by examiner

FOILS WITH SERRATIONS

CROSS-REFERENCE TO RELATED APPLICATION

This application is a continuation of International Application No. PCT/GB2019/053266, filed on Nov. 19, 2019, which is hereby incorporated by reference in its entirety.

TECHNICAL FIELD

The present disclosure relates to the reduction of noise for foils such as aerofoils and hydrofoils.

BACKGROUND

Aerofoil noise is important in a wide range of applications, such as wind turbines, aero-engines, high-speed propellers and fans. There is a general technical need to reduce aerofoil noise.

Aerofoil noise is complicated and is generally considered to be a combination of noise generated by multiple physical mechanisms of noise generation. These include, among others, noise due to scattering of the turbulent boundary layer by the trailing edge, tip vortex formation noise, and noise due to the scattering of incoming turbulence/unsteady gusts by the leading edge.

In many applications, in particular where more than one row of rotors are installed, the scattering of the unsteady flow by the leading edge of an aerofoil plays a crucial role in the noise generation. For example, in contra-rotating open rotor systems (such as a propfan engine), the wakes from the front row impinge on the downstream blades. This leads to a strong interaction between the unsteady wakes and the leading edge of the downstream blades, resulting in efficient noise radiation. This noise is often referred to as leading-edge noise, and it is considered as the main source in similar multi-row rotor systems such as in jet engines (i.e. gas turbine engines, such as a turbofan or turboprop engine).

The research on leading-edge noise dates back to the 1940s. Early attempts investigated the aerodynamic response of a flat plate subject to an sinusoidal gust focusing on an incompressible flow. This was later extended to compressible flows. In one approach, the acoustic response due to a single sinusoidal incoming gusts was obtained using the Schwarzschild method and the theory of Kirchhoff and Curle. The far-field sound was then related to the wavenumber spectral density of the vertical velocity fluctuations. Provided that this wavenumber spectral density can be modelled accurately, the far-field sound can be predicted robustly using this approach and agrees well with experimental results.

Due to the importance of leading-edge noise in many applications, techniques for its reduction have been of research interest for many years. One of the most widely studied approaches is to use bio-inspired serrated leading edges. It has been shown experimentally that the use of serrations leads to reduced leading-edge noise and improved aerodynamic performance at high angles of attack. The acoustic benefit of using serrations was also studied numerically in a number of recent works, where it has been shown that the dimensionless quantity $\bar{k}_1\bar{h}$ plays an important role in determining the effectiveness of the serrations, where $\bar{k}_1$ denotes the hydrodynamic wavenumber in the stream-wise direction and $\bar{h}$ denotes half of the root-to-tip length of the serrations.

Though the serrations have been shown to be able to reduce leading-edge noise effectively, the question of what serration geometry leads to the maximum noise reduction has not to date been answered. It is desirable to understand how the serration geometry changes the acoustic performance and how more acoustically effective serrations can be designed.

SUMMARY

Serration profiles have been developed for leading edges, trailing edges, or both leading and trailing edges of foils, such as aerofoils and hydrofoils, that reduce the generation of noise.

According to a first aspect of this disclosure, there is provided a foil having a leading edge and a trailing edge, of which at least a portion of one or both of the leading edge and trailing edge has a serrated profile comprising a plurality of adjoining teeth, each tooth having a tip point that represents a local maximum chord-wise extent of the tooth and, on each side span-wise of the tip point, a root point that represents a local minimum chord-wise extent of the tooth and at which the tooth adjoins a respective adjacent tooth, wherein the profile of the tooth edge between the tip point and an adjacent root point is subject to a limitation defined by the relative chord-wise positions of the tooth edge at first, second, third and fourth intermediate positions located respectively at 5%, 35%, 65% and 95% of the span-wise distance from the tip point to the root point, the chord-wise distance between the second and third intermediate positions being less than the chord-wise distance between the first and second intermediate positions and the chord-wise distance between the second and third intermediate positions being less than the chord-wise distance between the third and fourth intermediate positions, wherein the profile of the tooth edge between the tip point and the adjacent root point is subject to a further limitation in that the tangent to the tooth edge is not perpendicular to the chord-wise direction at any location on the tooth edge between the first intermediate position and the fourth intermediate position.

According to a further aspect of this disclosure there is provided a noise-reduction device having a serrated profile for attachment at a leading or trailing edge of a foil, the serrated profile comprising a plurality of adjoining teeth, each tooth having a tip point that represents a local maximum chord-wise extent of the tooth and, on each side span-wise of the tip point, a root point that represents a local minimum chord-wise extent of the tooth and at which the tooth adjoins a respective adjacent tooth, wherein the profile of the tooth edge between the tip point and an adjacent root point is subject to a limitation defined by the relative chord-wise positions of the tooth edge at first, second, third and fourth intermediate positions located respectively at 5%, 35%, 65% and 95% of the span-wise distance from the tip point to the root point, the chord-wise distance between the second and third intermediate positions being less than the chord-wise distance between the first and second intermediate positions and the chord-wise distance between the second and third intermediate positions being less than the chord-wise distance between the third and fourth intermediate positions, wherein the profile of the tooth edge between the tip point and the adjacent root point is subject to a further limitation in that the tangent to the tooth edge is not perpendicular to the chord-wise direction at any location on the tooth edge between the first intermediate position and the fourth intermediate position.

According to a further aspect of this disclosure, there is provided a foil having a leading edge and a trailing edge, of which at least a portion of one or both of the leading edge and trailing edge has a serrated profile comprising a plurality of adjoining teeth, each tooth having a tip point that represents a local maximum chord-wise extent of the tooth and, on each side span-wise of the tip point, a root point that represents a local minimum chord-wise extent of the tooth and at which the tooth adjoins a respective adjacent tooth, wherein the profile of the tooth edge between the tip point and an adjacent root point is defined in relation to a mid-point that is the position of the tooth edge at 50% of the span-wise distance between the tip point and root point, wherein the centroid of a 2D shape defined by the chord-wise line passing through the tip point, a span-wise line passing through the mid-point, and the profile of the tooth edge between the tip point and the mid-point is located at a chord-wise position that is less than ⅓ of the chord-wise distance from the mid-point to the tip point, and the centroid of a 2D shape defined by the chord-wise line passing through the root point, a span-wise line passing through the mid-point, and the profile of the tooth edge between the mid-point and the root point is located at a chord-wise position that is less than ⅓ of the chord-wise distance from the mid-point to the root point, wherein the profile of the tooth edge between the tip point and the adjacent root point is subject to a further limitation in that the tangent to the tooth edge is not perpendicular to the chord-wise direction at any location on the tooth edge between 5%, and 95% of the span-wise distance from the tip point to the root point.

According to a further aspect of this disclosure there is provided a noise-reduction device having a serrated profile for attachment at a leading or trailing edge of a foil, the serrated profile comprising a plurality of adjoining teeth, each tooth having a tip point that represents a local maximum chord-wise extent of the tooth and, on each side span-wise of the tip point, a root point that represents a local minimum chord-wise extent of the tooth and at which the tooth adjoins a respective adjacent tooth, wherein the profile of the tooth edge between the tip point and an adjacent root point is defined in relation to a mid-point that is the position of the tooth edge at 50% of the span-wise distance between the tip point and root point, wherein the centroid of a 2D shape defined by the chord-wise line passing through the tip point, a span-wise line passing through the mid-point, and the profile of the tooth edge between the tip point and the mid-point is located at a chord-wise position that is less than ⅓ of the chord-wise distance from the mid-point to the tip point, and the centroid of a 2D shape defined by the chord-wise line passing through the root point, a span-wise line passing through the mid-point, and the profile of the tooth edge between the mid-point and the root point is located at a chord-wise position that is less than ⅓ of the chord-wise distance from the mid-point to the root point, wherein the profile of the tooth edge between the tip point and the adjacent root point is subject to a further limitation in that the tangent to the tooth edge is not perpendicular to the chord-wise direction at any location on the tooth edge between 5%, and 95% of the span-wise distance from the tip point to the root point.

In some preferred embodiments, the serrated profile is provided on a leading edge of the foil. In other preferred embodiments, the serrated profile is provided on a trailing edge of the foil. In other preferred embodiments, the serrated profile is provided on both a trailing edge and a leading edge of the foil.

Preferably, the tangent to the tooth edge is not perpendicular to the chord-wise direction at any location on the tooth edge between 4%, and 96% of the span-wise distance from the tip point to the root point, more preferably between 3%, and 97% of the span-wise distance from the tip point to the root point, even more preferably between 2%, and 98% of the span-wise distance from the tip point to the root point, even more preferably between 1%, and 99% of the span-wise distance from the tip point to the root point, even more preferably between 0.5%, and 99% of the span-wise distance from the tip point to the root point.

Alternatively or additionally the tooth profile varies on a smooth path between the first intermediate position (5% point) and the fourth intermediate position (95% point) such that gradient of chord-wise position of the tooth edge with respect to span-wise position of the tooth edge is continuous between the first intermediate position and the fourth intermediate position (preferably between 4% and 96% of the span-wise distance from the tip point to the root point, more preferably between 3%, and 97% of the span-wise distance from the tip point to the root point, even more preferably between 2%, and 98% of the span-wise distance from the tip point to the root point, even more preferably between 1%, and 99% of the span-wise distance from the tip point to the root point, even more preferably between 0.5%, and 99% of the span-wise distance from the tip point to the root point).

Alternatively or additionally one or both of the tip point and root point may be blunt, having a region in which the tangent to the tooth edge is perpendicular to the chord-wise direction.

Alternatively or additionally the span-wise position of the tooth edge between first intermediate position and the fourth intermediate position may vary as a sigmoidal function of the chord-wise position of the tooth edge (preferably between 4% and 96% of the span-wise distance from the tip point to the root point, more preferably between 3%, and 97% of the span-wise distance from the tip point to the root point, even more preferably between 2%, and 98% of the span-wise distance from the tip point to the root point, even more preferably between 1%, and 99% of the span-wise distance from the tip point to the root point, even more preferably between 0.5%, and 99% of the span-wise distance from the tip point to the root point).

Alternatively or additionally the tooth edge profile between the first position and fourth position may be ogee-shaped having an inflection point at which the tangent is not perpendicular to the chord-wise direction (preferably between 4% and 96% of the span-wise distance from the tip point to the root point, more preferably between 3%, and 97% of the span-wise distance from the tip point to the root point, even more preferably between 2%, and 98% of the span-wise distance from the tip point to the root point, even more preferably between 1%, and 99% of the span-wise distance from the tip point to the root point, even more preferably between 0.5%, and 99% of the span-wise distance from the tip point to the root point). Preferably, the tooth edge profile between is ogee-shaped between the tip point and the root point.

Alternatively or additionally the chord-wise distance between the shared root point of two adjacent teeth and the tip point of a first tooth of the two adjacent teeth may be the same as or within 5% of, preferably within 2% of, more preferably within 1% of, even more preferably within 0.5% of, the chord-wise distance between the shared root point and the tip point of a second tooth of the two adjacent teeth.

Alternatively or additionally the chord-wise position of the tooth edge between tip point and root point may vary as a single-valued function of the span-wise position of the tooth edge.

Alternatively or additionally the tooth profile between the first intermediate position and the position of the tooth edge located at the mid-point between the first and fourth intermediate positions may have rotational symmetry with the tooth profile between the mid-point and the fourth intermediate position. Preferably the tooth profile between the tip point and the position of the tooth edge located at the mid-point has rotational symmetry with the tooth profile between the mid-point and the root point.

Alternatively or additionally each tooth of the plurality of adjoining teeth of the serrated profile has the same span-wise width or a span-wise width within 20%, preferably within 10%, more preferably within 5%, of a mean span-wise width of the plurality of adjoining teeth.

Alternatively or additionally the span-wise widths of the adjoining teeth of the serrated profile may vary across the serrated profile, preferably aperiodically, more preferably monotonically.

Alternatively or additionally the lengths of teeth, defined as the chord-wise distance from the tip point of a tooth to the average chord-wise position of the root points of the tooth, vary across the serrated profile, preferably aperiodically, more preferably monotonically.

Alternatively or additionally the ratio of the chord-wise distance between the tip point and the root point to the span-wise distance between the tip point and root point is greater than 0.5, preferably greater than 1, more preferably greater than 2.5, even more preferably greater than 5, even more preferably still greater than 10.

According to a further aspect of this disclosure, there is provided a turbomachine such as a steam turbine, a gas turbine, a wind turbine, a pump, a fan or a compressor, the turbomachine or turbine comprising one or more foils as described above.

According to a further aspect of this disclosure, there is provided an aircraft comprising one or more foils as described above. For example, the foil may be a wing or stabilizer or may be a rotor blade.

According to a further aspect of this disclosure, there is provided a watercraft comprising one or more foils as described above. For example, the foil may be a stabilizing fin or lifting surface, or may be a rotor blade such a propeller, particularly a screw propeller.

According to a further aspect of this disclosure, there is provided a fan such as a cooling fan comprising one or more foils as described above. For example, the fan may be configured for cooling electrical equipment such as a computer component. Other examples including fans for directing air in heating, ventilation and air conditioning (HVAC) applications.

In some of the above-described foils and noise-reduction devices, the tooth edge profile is defined between in the intermediate span-wise region beginning at 5% of the span-wise position between the tip point and the root point and ending at 95% of the span-wise position between the tip point and the root point. The span-wise distances between the first and second intermediate positions, the second and third intermediate positions, and third and fourth intermediate positions, are equal, which means that the average gradient (chord-wise change in tooth edge position with respect to span-wise change in tooth edge position) in each region is proportional to the chord-wise difference between the first and second intermediate positions, the second and third intermediate positions, and the third and fourth intermediate positions. But the general principle that the gradient is generally higher at positions on the tooth edge closer to the tip point and root point than at positions away from the tip point and root point, which is shown in the discussion below to provide improved noise reduction relative to sawtooth profiles as used in the prior art (that otherwise have the same serration height to serration wavelength ratio), can be defined or characterized in other ways.

While preferably the average gradient is also high in the 0% to 5% region and the 95% to 100% region, i.e. at least as high as the average gradient in the region between first and second intermediate positions in the case of the 0 to 5% region and at least as high as the average gradient between the third and fourth intermediate positions in the case of the 95% to 100% region, this is not strictly required. The inventors have recognized that the limitations in these regions immediately around the tip point and root point may be relaxed and the advantages of noise reduction may still be obtained. For the limitations to be relaxed it is believed to be enough that the width of the tip points and root points be sufficiently small relative to the hydrodynamic wavelength. For serration profiles with which non-negligible noise reduction might be obtained, it is believed that a tip point or root point 'half width' of 5% of the span-wise tip point to root point is sufficiently narrow to still provide noise reduction advantages, since the span-wise tip point to root point distance is also selected based on the hydrodynamic wavelength.

The tooth edge profile may alternatively be defined with different values for the tip point or root point 'half width' at which the limitations or relaxed. For example, where the 'half width' of the tip point and root point is 1% of the span-wise distance between tip point and root point, the first and fourth intermediate positions may be located at 1% and 99% (i.e. 100%−1%) of the span-wise distance between tip point and root point. The second and third intermediate positions are then positioned to divide the remaining portion of the tooth edge profile into three portions of equal span-wise width, i.e. at 1%+(100%−1%−1%)/3, and at 1%+(100%−1%−1%)*2/3 respectively.

More generally, for half widths of other percentages of span-wise distance from tip point to root point, such as 0.5%, 2%, 3%, 4%, 6%, 7%, 8%, 9%, 10% etc., in which the limitations are relaxed, but with which noise reduction might still be obtained, the positions of the first, second, third and fourth intermediate positions are given by the following percentages of the span-wise distance between tip point and root point, for x % half width: x; (100−2x)/3; (100−2x)*2/3; 100−x.

Another approach to characterizing the general principle of high gradient (chord-wise change with respect to span-wise change) in the neighbourhood of the tip point and root point is to recognize the implications of such a gradient distribution on whether the tooth edge profile is convex or concave, in terms of chord-wise position of the tooth edge with respect to span-wise location. For example, the tooth edge profile may be defined as being wholly or at least mostly concave between the tip point and the tooth edge profile at a mid-point located at 50% of the span-wise distance between tip point and root point. By wholly or mostly concave, it is meant that the tooth edge profile between tip point and the mid-point is located mostly or entirely below (more downstream in the case of a leading edge serration, more upstream in the case of a trailing edge serration) the straight line between the tip point and the mid-point.

The tooth edge profile between tip point and mid-point may be described as mostly concave if the average chord-wise position of the tooth edge between the tip-point and mid-point is closer to the mid-point than the tip point. Similarly, for the tooth edge profile between the mid-point and the root point, the average position of the tooth edge between the mid-point and root point An alternative approach is to compare the chord-wise position of the centroid of the 2D shape, defined by the chord-wise line passing through the tip point, the span-wise line passing through the mid-point (that is the position of the tooth edge at 50% of the span-wise distance between the tip point and root point), and the tooth edge profile between the tip point and the mid-point, with corresponding triangle, defined by the chord-wise position of the equivalent triangle defined by the chord-wise line passing through the tip point, the span-wise line passing through the mid-point, and straight line the tip point and the mid-point.

The centroid of the triangle is located at a chord-wise position ⅓ of the chord-wise distance from the mid-point to the tip point. For the purpose of defining whether a tooth edge profile is concave or mostly concave such that the noise reduction advantages of the invention may be conferred, the tooth edge profile is mostly concave if the centroid of the 2D shape (defined by the chord-wise line passing through the tip point, the span-wise line passing through the mid-point, and the tooth edge profile between the tip point and the mid-point) is located at a chord-wise position that is less than ⅓ (preferably less than ¼, more preferably less than ⅕, even more preferably less than ⅙) of the chord-wise distance from the mid-point to the tip point. In other words, the centroid of this portion of the 2D tooth shape is further downstream, in the case of a leading edge serration, or further upstream, in the case of a trailing edge serration, than the chord-wise point that is located at ⅓ of the chord-wise distance from the mid-point to the tip point.

Similarly, for the tooth profile between the mid-point and the root point, the chord-wise location of the centroid of the 2D shape defined by the chord-wise line passing through the root point, the span-wise line passing through the mid-point, and the tooth edge profile between the mid-point and the root point, is located at less than ⅓ (preferably less than ¼, more preferably less than ⅕, even more preferably less than ⅙) of the chord-wise distance from the mid-point to the root point.

Thus, as an alternative to—or in addition to—the definition of the tooth edge profile between tip point and root point in terms of the chord-wise positions the tooth edge at first, second, third and fourth intermediate positions located at 5%, 35%, 65%, and 95% of the span-wise distance between tip point and root point: 1) alternative intermediate positions may be used, e.g. as per the expressions for the intermediate position percentages x; $(100-2x)/3$; $(100-2x)*⅔$; $100-x$ for half width $x=0.5, 1, 2, 3, 4, 5, 6, 7, 8, 9, 10$; and/or 2) the concavity of the tooth edge profile between tip point and a mid-point located at 50% of the span-wise distance between tip point and root point, and of the tooth edge profile between the mid-point and the root point may be used; the chord-wise position of the tooth edge is mostly (e.g. on average) closer to the mid-point in the portion of the tooth edge profile between the tip point and the mid-point and is also closer to the mid-point in the portion of the tooth edge profile between the mid-point and the root point; and/or 3) the concavity may be determined by way of the chord-wise position of the centroids of 2D shapes defined between a) chord-wise lines passing through tip points and root points, b) a span-wise line passing through the mid-point (i.e. the position of the tooth edge at 50% of the span-wise distance between tip point and root point), and c) the tooth edge profile between, respectively, the tip point and the mid-point, and the mid-point and the root point. There remains a requirement that the tangent to the tooth edge is not perpendicular to the chord-wise direction at any location on the tooth edge between the first and last intermediate positions, i.e. between x % and (100%–x %) for $x=0.5, 1, 2, 3, 4, 5, 6, 7, 8, 9, 10$, preferably $x=5\%$.

According to a further aspect of the invention, the foils in some applications may have a mean flow direction that is not aligned with the chord-wise direction of the foil or aerofoil. An example application is the leading edge of a centrifugal fan, in which air is sucked in axially and impeller blades displace the air radially, the impeller blades changing the direction of air flow from axial to radial, i.e. by 90° or so. In such cases, the 'chord-wise' direction is defined at the leading edge as being aligned with the mean flow direction, with all of the mathematical approaches set out above rotated in the mean flow direction.

Foils and noise reduction devices as described herein may comprise a single serrated region of which a single tooth has a tooth edge profile as described herein on just one side of the tooth (tip point to one of the adjacent root points), or multiple teeth having tooth edge profiles as described herein, on one or both sides of the teeth. Such teeth may be located next to one another or dispersed among other teeth having different tooth edge profiles, such as sinusoidal or sawtooth. Preferably, all teeth in the serrated region have tooth edge profiles as described herein.

In some preferred embodiments the techniques described herein are applied to a serrated region of a foil or noise reduction device in which the teeth and/or the serrated region are moveable between several positions. This may permit the foil to be tuned during based on desired noise reduction properties and/or other fluid dynamic properties. The teeth and/or the serrated region may be moveable or changeable between a deployed configuration and a non-deployed configuration or to one or more intermediate configurations between a deployed and a non-deployed configuration. The non-deployed configuration may comprise the teeth or serrated regions being wholly or partly retracted into the foil or noise reduction device or onto a top or bottom surface of the foil or noise reduction device. In some embodiments one or more teeth are independently controllable relative to one or more other teeth. In some embodiments each tooth is independently controllable. In some embodiments the foil or noise reduction device comprises multiple serrated region, each region being independently controllable in addition to or as an alternative to each tooth being independently controllable. In some embodiments the foil or noise reduction device comprises one or more non-controllable or fixed teeth or serrated regions and one or more controllable or moveable teeth or serrated regions.

In some preferred embodiments a tooth adjoins an adjacent tooth on either side at a shared root, with one or more of the geometrical restrictions described herein applied to the tooth edge profiles on one or both sides of the tooth and, for each adjacent tooth, to one or both of the two tooth edge profiles of the adjacent tooth. Preferably a serrated region comprises a plurality of teeth adjoining one another with the root of each tooth of the plurality of teeth adjoining the root of an adjacent tooth on either side, with one or more of the geometrical restrictions described herein applied to one or both tooth edge profiles on either side of some of, most of, or all of the teeth of the plurality of teeth. Preferably the serrated region comprises a plurality of adjacent teeth comprising at least two, three, four, five, six, seven, eight, nine, 10, 20, 30, 40, 50, 60, 70, 80, 90, 100, 300, 600, or 1000 teeth or more, with the geometrical restrictions described herein applied to one or both tooth edge profiles on either side of some of, most of, or all of the teeth of the plurality of teeth with one or more of the geometrical restrictions described herein applied to the tooth edge profiles on either side of some of, most of, or all of the teeth of the plurality of teeth. The one or more geometrical restrictions may be applied, in a plurality of teeth to one tooth edge profile of each tooth, on either the same side or different sides, or may be applied to both sides of each teeth, or to both sides of a portion of the teeth and one side (same or different) of another portion of the teeth.

In some preferred embodiments the techniques described herein are applied to a serrated region of a foil or noise reduction device, the serrated region comprising at least three teeth including a first tooth, a second tooth and a third tooth, of which the tooth adjoins the first tooth at a shared root on one side and adjoins the third tooth at a shared root on the other side, wherein at least one of the at least three teeth has, on at least one side of the tooth, a tooth edge profile that complies with one or more of the geometrical restrictions described herein. Preferably each of the first, second and third teeth has, on at least one side of the tooth, a tooth edge profile that complies with one or more of the geometrical restrictions described herein. More preferably each of the first, second and third teeth has, on either side of the tooth, a tooth edge profile that complies with one or more of the geometrical restrictions described herein. In some preferred embodiments, the serrated profile includes three teeth in a line together, of which a middle tooth adjoins its two neighbours at shared roots, wherein each tooth preferably has an ogee-shaped tooth edge profile on either side of the tooth's tip.

In some embodiments the teeth are flat and sheet-like, i.e. having a thickness that is less than the tooth width, where the a thickness of the tooth is the dimension of the tooth in a direction normal to the chord-wise and span-wise directions (e.g. for a horizontal aerofoil in which the chord-wise and span-wise directions are both in a horizontal plane, the thickness of a tooth at a leading or trailing edge may be the thickness of the tooth in a vertical direction). Such teeth might be formed out of a sheet material such as a sheet metal. In some embodiments the teeth have a thickness that matches or conforms to the foil to which they are attached. In some embodiments the teeth have a varying thickness, such as a chord-wise varying thickness, such as a thickness that decreases in a chord-wise direction from the chord-wise location at which they join the foil, at which their thickness may match or otherwise conform to a local thickness of the foil, to a minimum at the tips of the teeth. In some embodiments the teeth might be in-cut from the leading or trailing edge of a foil, wherein portions of a leading or trailing edge are removed to provide the gap or void space between teeth; in such cases the thickness of the teeth may be the same as the original foil thickness local to the tooth. In some embodiments the shape of the leading edge may be the same, substantially the same, or at least similar, at each point along the span, wherein the presence of the teeth causes a chord-wise offset to the shape of the leading edge according to chord-wise position of the leading edge along the tooth edge profile.

In some preferred embodiments the techniques described herein are applied to a serrated region of a foil or noise reduction device in which adjacent teeth do not overlap each other when viewed from a direction normal to the chord-wise and span-wise directions (e.g. for a horizontal aerofoil in which the chord-wise and span-wise directions are both in a horizontal plane, adjacent teeth do not overlap when viewed vertically).

An explanation for the effectiveness of foils having such serrations is set out below. Briefly, and in advance of a more detailed explanation provided below, the inventors have found that the serration profile should preferably not have any stationary points in order to accomplish the best sound reduction performance at high frequencies. Piecewise smooth functions can be constructed to satisfy this condition. The inventors have recognized that this condition may be relaxed at tip points, and root points, where practical limitations on the sharpness of a serration tip point or root point may exist, but is maintained at portions of the serration edge away from the tip point or root point.

For such serrations, improved noise reduction performance may be obtained for serrations with large slopes at the non-smooth points compared to the widely used sawtooth serrations. This requires that the serration profile is not uniform (linear).

To study the benefit that may be obtained by using the new design in practical applications, an energy spectrum for the vertical velocity fluctuations of the incoming turbulence based on the Von Kármán spectrum is used. The predicted PSDs at 90° above the serration are compared with those for the widely used sawtooth serrations. It is found that additional noise reduction, up to 8 dB for example, can be achieved in the frequency range of interest with sufficiently sharp serrations. At low frequencies, one may expect a slight noise increase but this is often negligible. Following the analytical prediction, an experimental investigation was carried out. The experimental results demonstrate that the new design is superior than the convection sawtooth design. For example, a 7 dB additional noise reduction was observed using one of the new type of serrations compared with conventional sawtooth serration.

While the study reported in this disclosure focuses on the leading-edge noise and its reduction using leading-edge serrations, the noise reduction mechanism is known to be similar to that for the turbulent boundary layer trailing-edge noise. Hence, the present analysis and newly proposed serration profile are expected to work in a similar manner for trailing edges.

Analysis of Leading-Edge Noise Generation

FIG. 1 shows a serrated aerofoil that is assumed to be a semi-infinite plate placed in a uniform incoming flow of density $\tilde{\rho}$ and velocity $\tilde{U}$ at zero angle of attack. The speed of sound is denoted by $\tilde{c}_0$. The serration wavelength $\lambda^*$ is used to normalized the length dimension, while $\tilde{\rho}$ and $\tilde{U}$ are used to nondimensionalize other dynamic variables such as the velocity potential and pressure.

We restrict our attention to periodic serrations. Because the geometric parameters are normalized by the serration wavelength, the serrations have a period 1. The normalized root-to-tip length is $2h^*$. Let x, y, z (as shown in FIG. 1) denote the stream-wise, span-wise and normal to the plate directions, respectively. The coordinate origin is fixed in the middle between the root and tip. In such a coordinate frame, the serration profile can be described by hF(y), where F(y) is a single-valued function subject to the following constraints but otherwise arbitrary: F(y) has a maximum value of 1 and minimum value of −1. The smallest period of F(y) is 1.

When the turbulence in the mean flow passes the leading edge, a scattered potential flow is induced. The scattered potential ensures appropriate boundary conditions to be satisfied. In the leading-edge noise problem, the vertical velocity fluctuation is of our primary concern. The turbulence in the mean flow consists of a wide range of time and length scales. However, a Fourier transform can be applied to the vertical velocity field, such only a harmonic gust needs to be considered:

$$\omega_i = \omega_0 e^{i(-\omega t + k_1 x + k_2 y)} \tag{1}$$

where t denotes time (normalized, as are the following quantities unless noted otherwise), $\omega_0$ the velocity fluctuation in the z direction, $\omega$ the angular frequency and $k_1$ and $k_2$ the wavenumbers in the stream-wise and span-wise directions, respectively. The turbulence is assumed to be frozen and convects downstream at the speed $\tilde{U}$. Therefore, one has $k_1 = \omega$.

The scattered velocity potential is denoted by $\phi_s$. It can be shown that $\phi_s$ satisfies the convective wave equation (2)

$$\nabla^2 \phi_s - M^2 \left( \frac{\partial}{\partial t} + \frac{\partial}{\partial x} \right)^2 \phi_s = 0$$

where $M = \tilde{U}/\tilde{c}_0$. To ensure that the normal velocity on the plate vanishes, the following is required:

$$\frac{\partial \phi_s}{\partial z} \bigg|_{z=0} = -\omega_0 e^{i(-\omega t + k_1 x + k_2 y)}, \; x > hF(y). \tag{3}$$

The scattering problem is anti-symmetric across z=0 and therefore $$\phi_s |_{z=0} = 0, \; x < hF(y). \tag{4}$$

This is a mixed boundary condition problem. It can be solved using Wiener-Hopf method. For the sake of completeness the essential steps are as follows:

With the harmonic time dependence ($\phi_s = \Phi_s e^{-i\omega t}$), the convective wave equation becomes $$\beta^2 \frac{\partial^2 \Phi_s}{\partial x^2} + \frac{\partial^2 \Phi_s}{\partial y^2} + \frac{\partial^2 \Phi_s}{\partial z^2} + 2ikM \frac{\partial \Phi_s}{\partial x} + k^2 \Phi_s = 0, \tag{5}$$

where $\beta^2 = 1 - M^2$ and $k = k_1 M$, the variables being nondimensionalized as described above.

To eliminate the first-order differential term a new dependent variable is introduced:

$\Phi = \Phi_s e^{ikMx/\beta^2}$. With a change of variable $\xi = [x - hF(y)]/\beta$, $\eta = y$, $\zeta = z$:

$$\frac{\partial^2 \Phi}{\partial \xi^2} + \frac{\partial^2 \Phi}{\partial \eta^2} + \frac{\partial^2 \Phi}{\partial \zeta^2} - 2\ddot{h} F'(\eta) \frac{\partial^2 \Phi}{\partial \xi \partial \eta} - \tag{6}$$

$$\ddot{h} F''(\eta) \frac{\partial \Phi}{\partial x} + \ddot{h}^2 F'^2(\eta) \frac{\partial^2 \Phi}{\partial \xi^2} + \ddot{k}^2 \Phi = 0$$

where $\ddot{h} = h/\beta$ and $\ddot{k} = k/\beta$. Upon defining $\ddot{k}_1 = k_1/\beta$, the boundary conditions are now:

$$\frac{\partial \Phi}{\partial \zeta} \bigg|_{\zeta=0} = \omega_0 e^{i(\ddot{k}_1 \xi + \ddot{k}_1 hF(\eta) + k_2 \eta)}, \; \xi > 0 \tag{7}$$

and $$\Phi |_{\zeta=0} = 0, \; \xi < 0. \tag{8}$$

Considering the span-wise periodicity of the serrations, $\Phi$ is also required to satisfy the following periodicity condition:

$$\Phi |_{\eta=0} = \Phi |_{\eta=1} e^{-ik_2}, \; \frac{\partial \Phi}{\partial x} \bigg|_{\eta=0} = \frac{\partial \Phi}{\partial x} \bigg|_{\eta=1} e^{-ik_2} \tag{9}$$

A Fourier Transform can be performed in the stream-wise direction:

$$\tilde{\Phi}(s, \eta, \zeta) = \int_{-\infty}^{\infty} \Phi(\xi, \eta, \zeta) e^{is\xi} d\xi \tag{10}$$

It can then be shown that $$(\ddot{k}^2 - s^2)\tilde{\Phi} + \frac{\partial^2 \tilde{\Phi}}{\partial \zeta^2} + \frac{\partial^2 \tilde{\Phi}}{\partial \eta^2} + \tag{11}$$

$$2is\ddot{h}F'(\eta)\frac{\partial \tilde{\Phi}}{\partial \eta} + is\ddot{h}F''(\eta)\tilde{\Phi} - s^2 \ddot{h}^2 F'^2(\eta)\tilde{\Phi} = 0$$

Trying separable solutions $\tilde{\Phi}(s, \eta, \zeta) = Y(\eta; s) \cdot Z(\zeta; s)$ yields two ordinary differential equations. By separation of variables, the general solution $\tilde{\Phi}$ can be written as $$\tilde{\Phi}(s, \eta, \zeta) = \sum_{n=-\infty}^{\infty} A_n(s) \, \text{sgn}(\zeta) e^{-\gamma_n |\zeta|} e^{-ishF(\eta)} e^{i\chi_n \eta}, \tag{12}$$

where $$\chi_n = 2n\pi + k_2, \; \gamma_n = \sqrt{s^2 - \kappa_n^2}, \; \kappa_n^2 = \ddot{k}^2 - \chi_n^2$$

and the sign function sgn(x) returns 1 when x≥0 and −1 when x<0. Because of the orthogonality of the functions $Y(\eta; s)$ with their Schwartz conjugates, each mode can be calculated individually using the Wiener-Hopf method (described later for completeness) to obtain $$\tilde{\Phi}(s, \eta, \zeta) = \tag{13}$$

$$\sum_{n=-\infty}^{\infty} \left( \frac{i\omega_0 E_n(s)}{(s + \ddot{k}_1)\sqrt{s + k_n} \sqrt{-\ddot{k}_1 - k_n}} \text{sgn}(\zeta) e^{-\gamma_n |\zeta|} e^{-ishF(\eta)} e^{i\chi_n \eta} \right)$$

where $$E_n(s) = \int_0^1 e^{i(\ddot{k}_1 + s)\ddot{h}F(\eta)} e^{-i2n\pi\eta} d\eta \tag{14}$$

In the far-field, equation 13 can be inverted using the method of steepest descent, yielding:

$$\Phi(r, \theta, y) = \sum_{n=-\infty}^{\infty} \frac{e^{i\pi/4}}{\sqrt{\pi}} \frac{e^{i\kappa_n r}}{\sqrt{r}} \cos\frac{\theta}{2} \frac{\omega_0 E_n(-\kappa_n \cos\theta)}{(-\kappa_n \cos\theta + \bar{k}_1)\sqrt{-\bar{k}_1 - \kappa_n}} e^{i\chi_n y} \quad (15)$$

$\Phi_s$ is directly given by $\Phi_s = \Phi e^{-ikMx/\beta^2}$ and the pressure is related to $\Phi_s$ via $$p(r, \theta, y) = ik_1 \Phi_s - \frac{\partial \Phi_s}{\partial x} \quad (16)$$

Equation 15 shows that the effects of serrations on velocity potential and the pressure are solely determined by the functions $E_n(-k_n \cos \theta)$ because at no other locations does the function $F(\eta)$ appear.

The inventors have recognized that the serration profile may be optimized by investigating the functions $E_n$.

Equation 16 can be shown to be equivalent to:

$$p(r, \theta, y) = \left(i\frac{k_1}{\beta^2}\Phi - \frac{\partial \Phi}{\partial x}\right) e^{-ikMx/\beta^2} \quad (17)$$

Equation 17 is still quite complicated. This is because equation 15 has a complicated dependence on the azimuthal angle θ, hence making the differentiation over x troublesome.

However, the final results can be simplified by keeping only the leading-order terms since only the far-field is of interest. This yields $$p(r, \theta, y) \approx \sum_{n=-\infty}^{\infty} \left( i\left(\frac{k_1}{\beta^2} - \kappa_n \cos\theta\right) \cdot \frac{e^{i\pi/4}}{\sqrt{\pi}} \cdot \frac{e^{i\kappa_n r}}{\sqrt{r}} \cdot \cos\frac{\theta}{2} \cdot \right.$$
$$\left. \frac{\omega_0 E_n(-\kappa_n \cos\theta) e^{-ikMx/\beta^2}}{(-\kappa_n \cos\theta + \bar{k}_1)\sqrt{-\bar{k}_1 - \kappa_n}} \cdot e^{i\chi_n y} \right) \quad (18)$$

To write equation 18 in a more compact form, $H(\omega, \hat{x}, k_2)$ denotes the expression:

$$\frac{e^{i\pi/4}}{\sqrt{\pi}} e^{-ikMx/\beta^2} \cdot \cos\frac{\theta}{2} \cdot \sum_{n=-\infty}^{\infty} \left( \frac{\frac{k_1}{\beta^2} - \kappa_n \cos\theta}{\bar{k}_1 - \kappa_n \cos\theta} \cdot \frac{1}{\sqrt{\bar{k}_1 + \kappa_n}} \frac{e^{i\kappa_n r}}{\sqrt{r}} \cdot e^{i\chi_n y} \cdot \right.$$
$$\left. E_n(-\kappa_n \cos\theta) \right). \quad (19)$$

With this, equation 18 can be written in a more compact form as:

$$p(r, \theta, y) \approx H(\omega, \hat{x}, k_2) \omega_0 \quad (20)$$

Equation 18 is the induced far-field sound pressure by a single gust with a span-wise wavenumber $k_2$. The incoming turbulence can be modelled using a series of these gusts with different $k_2$ with a fixed value of $k_1 = \omega$, i.e.

$$\omega_t = \int_{-\infty}^{\infty} \omega_0(\omega, k_2) e^{i(-\omega t + k_1 x + k_2 y)} dk_2 \quad (21)$$

Because of the linearity, the total sound pressure in the far-field induced by such turbulence is $$p(r, \theta, y) \approx \int_{-\infty}^{\infty} H(\omega, \hat{x}, k_2) \omega_0(\omega, k_2) dk_2 \quad (22)$$

Since the incoming turbulence is statistically stationary, the far-field sound may be formulated statistically. The sound Power Spectral Density (PSD) of the far-field sound is given by:

$$\Psi(\omega, r, \theta, y) = \lim_{T \to \infty} \left(\frac{\pi}{T} \cdot p_t(r, \theta, y) \cdot p_t^*(r, \theta, y)\right), \quad (23)$$

where 2T is the time interval used to performed the temporal Fourier transform to obtain $p_t$ and the asterisk denotes the complex conjugate. Substituting equation 22 into equation 23, it can be shown that $$\Psi(\omega, r, \theta, y) \approx \int_{-\infty}^{\infty} |H(\omega, \hat{x}, k_2)|^2 \Phi_{ww}(\omega, k_2) dk_2 \quad (24)$$

where $\Phi_{ww}(\omega, k_2)$ is the wavenumber power spectral density of the vertical velocity fluctuations defined by $$\Phi_{ww}(\omega, k_2) = \lim_{T \to \infty} \left(\frac{\pi}{T} \omega_0(\omega, k_2) \cdot \omega_0^*(\omega, k_2)\right) \quad (25)$$

Writing $|H|^2$ explicitly, the following is obtained:

$$|H(\omega, \hat{x}, k_2)|^2 = \frac{1}{\pi} \cos^2\frac{\theta}{2} \cdot \quad (26)$$
$$\left| \sum_{n=-\infty}^{\infty} \left( \frac{\frac{k_1}{\beta^2} - \kappa_n \cos\theta}{\bar{k}_1 - \kappa_n \cos\theta} \cdot \frac{1}{\sqrt{\bar{k}_1 + \kappa_n}} \cdot \frac{e^{i\kappa_n r}}{\sqrt{r}} \cdot e^{i\chi_n y} \cdot E_n(-\kappa_n \cos\theta) \right) \right|^2$$

As set out above, for fixed serration wavelength and root-to-tip amplitudes the effects of serrations profiles on the scattered sound are solely determined by the functions $E_n(-k_n \cos \theta)$. Therefore focus is on investigating the behaviour of $E_n(-k_n \cos \theta)$ as the serration profile changes.

Equation 24 gives the form of the far-field PSD at the azimuthal angle θ. To investigate the effects of serration shapes on far-field noise, it is convenient to restrict attention to a specific observer point. As an example θ=π/2 is chosen as the example, which is of interest in common applications such as wind turbines. When θ=π/2, equation 24 simplifies to $$\Psi\left(\omega, r, \frac{\pi}{2}, y\right) \approx \quad (27)$$

$$\frac{1}{\pi\beta^2} \cdot \cos^2\frac{\pi}{4} \cdot \int_{-\infty}^{\infty} \left| \sum_{-\infty}^{\infty} \frac{1}{\sqrt{\bar{k}_1 + \kappa_n}} \cdot \frac{e^{i\kappa_n r}}{\sqrt{r}} \cdot e^{i\chi_n y} \cdot E_n(0) \right|^2 \cdot$$

$$\Phi_{ww}(\omega, k_2) dk_2$$

Equation 27 shows that the sound reduction performance of the various serrations at $\theta=\pi/2$ is determined by $E_n(0)$, which does not depend on $k_2$.

From equation 47 (presented later with the Wiener-Hopf technique) it is seen that $$E_n(0) = \int_0^1 e^{-i2n\pi\eta} e^{i\bar{k}_1 \bar{h} F(\eta)} d\eta \quad (28)$$

At low frequencies the exponent in the integral $\ddot{k}_1 \ddot{h} F(\eta) \to 0$. Consequently, no matter what serration profile is used, $E_n(0) \to \delta_{n,0}$, where $\delta_{n,m}$ is the Kronecker delta. This is the same result as would be obtained for straight leading edges, i.e. leading edges without serrations. By this theory, at low frequencies, little sound reduction is possible and the serration shape does not play any meaningful role in the generation of leading-edge noise.

As the frequency increases, the exponent $\ddot{k}_1 \ddot{h} F(\eta)$ varies from negative to positive values, and when this varying range is large enough, for example from $-\pi$ to $\pi$, the integrand (both real and imaginary parts) varies from negative to positive values. This results in oscillatory cancellation and the integrals obtain an amplitude of less than 1. However, in this intermediate frequency range, the serration shape plays a complicated role, and the exact optimal shape closely depends on which particular frequency band is of interest. Therefore by this theory there is generally unlikely to be one specific serration profile that outperforms any others at all frequencies in this frequency range.

Effective noise reduction can be achieved at relatively high frequencies, e.g. $\ddot{k}_1 \ddot{h} > \pi$, where the oscillatory of the integrand becomes stronger and the cancellation becomes more effective. This frequency range is generally of more interest in practical applications and is of primary interest in this disclosure.

Maximizing the sound reduction at these relatively high frequencies, is begun by minimizing $|E_n(0)|$ for each n as $\ddot{k}_1 \ddot{h} \to \infty$.

For the remainder of this disclosure, the large number $\ddot{k}_1 \ddot{h}$ is written as $\Delta$ for clarity. $\Delta$ simply denotes the nondimensionalized hydrodynamic wavenumber (hence frequency) based on a half of the root-to-tip amplitude of the serration.

Determining Serration Profiles to Reduce Noise Generation

In the following it is revealed that, in order to have optimal acoustic performance as the frequency $\Delta \to \infty$, the serration profile function F(y) cannot have any stationary points, i.e. locations where the gradient of F(y) in terms of y is zero, or, equivalently, locations where the tangent to the curve defining the serration profile is perpendicular to the stream-wise direction.

This is shown by investigating the asymptotic behaviour of $|E_n(0)|$ as $\Delta \to \infty$ when there are stationary points in the interval between 0 to 1.

Because only a certain number of modes are expected to be 'cut-on' in the frequency range of interest (i.e. detectable at the far-field—a 'cut-off' mode decays exponentially whereas a 'cut-on' mode propagates and so is detectable by an observer located in the far-field), attention is restricted to small finite |n| and |m| values (when ami is large, the mode becomes cut-off) while $\Delta \to \infty$.

Since $E_n(0)$ is given by $$E_n(0) = \int_0^1 e^{-i2n\pi\eta} e^{i\Delta F(\eta)} d\eta \quad (29)$$

$E_n(0)$ can be estimated using the method of stationary phase. If $\eta_i$ denotes the i-th stationary point of $F(\eta)$, then around $\eta_i$ the integrand can be expanded as $$e^{i\Delta}\left(F(\eta_i) + \frac{1}{2}F''(\eta_i)(\eta-\eta_i)^2 + o((\eta-\eta_i)^3)\right) \quad (30)$$

so that equation 29 may be estimated to be $$E_n(0) \sim \sqrt{\frac{2\pi}{\Delta}} \sum_i e^{i2n\pi\eta_i} \cdot \frac{1}{\sqrt{|F''(\eta_i)|}} \cdot e^{i\Delta F(\eta_i)} \cdot e^{i \cdot sgn(F''(\eta_i))\pi/4} \quad (31)$$

as $\Delta \to \infty$.

Equation 31 shows that as the leading order of $|E_0|$ scales as $1/\sqrt{\Delta}$ as $\Delta \to \infty$.

The inventors have recognized that it is desirable to avoid this because, as will be discussed below, a serration profile free of stationary points can lead to $|E_n(0)| \sim 1/\Delta$ for the leading-order approximation.

The serration profile $\sin 2\pi y$ is taken as an example. For this serration profile, equation 29 can be evaluated analytically to be $$E_n(0) = J_n(\Delta), \quad (32)$$

where $J_n(z)$ is the n-th-order Bessel function of the first kind.

For large arguments, the Bessel function tends to $$J_n(z) \sim \sqrt{\frac{2}{\pi z}} \cdot \cos\left(z - \frac{n\pi}{2} - \frac{\pi}{4}\right) \quad (33)$$

This means that the leading order of $|E_0|$ for the serration profile $\sin 2\pi y$ is given by:

$$|E_n(0)| \sim \sqrt{\frac{2}{\pi \Delta}} \cdot \left|\cos\left(z - \frac{n\pi}{2} - \frac{\pi}{4}\right)\right| \quad (34)$$

This is consistent with equation 31 and the concept of the leading order of $|E_0|$ scaling as $1/\sqrt{\Delta}$ as $\Delta \to \infty$ for serration profiles with stationary points.

In order for the leading edge to be both serrated and not have stationary points then the profile cannot be smooth everywhere. Because $F(0)=F(1)=0$ and the maximum and minimum values of $F(\eta)$ are 1 and −1 respectively, there must be at least a neighbourhood over which $F'(\eta)$ are negative, and another positive. If F(η) is first-order continuously differentiable, then F'(η) is a continuous function obtaining some positive and negative values in certain regions of η. From the intermediate value theorem, there must be a (some) point(s) where F'(η)=0. Hence to make sure the serration profile does not contain any stationary points, the profile function F(η) must not be everywhere smooth.

A serration profile free of stationary points can be easily obtained by relaxing F(η) to be piecewise smooth, where F(η) is free of stationary points in each of these piecewise regimes. This means that there are a finite number of discrete points around which F'(y) (or even F(η)) is not continuous, such as the root and tip points of a sawtooth serration. For convenience, $\eta_i=(i=1,2 \ldots)$ denotes these non-smooth points.

For serration of the type described above, the leading order asymptotic expansion of $|E_n(0)|$ as $\Delta \to \infty$ behaves as $1/\Delta$. This is shown by performing integration by parts for equation 29 to obtain:

$$E_n(0) = \sum_i \frac{1}{i\Delta} \left( \frac{e^{-i2n\pi\eta} e^{i\Delta F(\eta)}}{F'(\eta)} \bigg|_{\eta_i}^{\eta_i+1} - \int_{\eta_i}^{\eta_i+1} e^{i\Delta F(\eta)} \frac{d}{d\eta} \frac{e^{-i2n\pi\eta}}{F'(\eta)} d\eta \right). \quad (35)$$

Equation 35 can be shown to have a leading-order term $1/\Delta$ by performing another integration by parts and using the fact that n remains finite according to the Riemann-Lebesgue lemma. Hence as $\Delta \to \infty$ the above equation can be estimated by keeping only the leading order term to obtain:

$$E_n(0) \sim \frac{1}{i\Delta} \sum_i \frac{e^{-i2n\pi\eta} e^{i\Delta F(\eta)}}{F'(\eta)} \bigg|_{\eta_i}^{\eta_i+1} \quad (36)$$

Equation 36 shows that, as $\Delta \to \infty$, the value of $|E_n(0)|$ does indeed have a leading-order asymptotic term of $1/\Delta$, which is smaller than that shown in equation 31 for serrations with stationary points.

Therefore to have a better noise reduction performance at high frequencies, serration profiles without stationary points are preferred.

Equation 36 provides more information. In particular, it shows that the asymptotic value of $|E_n(0)|$ depends crucially on the slope of the serration profile at the non-smooth points. It is not very sensitive on the slope at other points. More importantly, this shows that the larger the absolute value of F'(η) is, the smaller each term's magnitude in the sum shown in equation 36 is. Therefore, to minimize $|E_n(0)|$, it is desirable to have a serration shape that is sharper (i.e. large slope magnitude) in the local vicinity around the non-smooth points. For a sawtooth serration profile that is commonly used in various application, the slope magnitude is uniformly the same as 4 (nondimensionalized, for change in stream-wise location of edge of 2 in half of a wavelength). However, by using a serration that is sharper at the non-smooth points, for example, with the slope magnitude being 8 at the non-smooth points, a further noise reduction by around 6 dB could be expected.

It should be borne in mind that these results are obtained for high frequencies. Therefore, in the intermediate frequency regime, e.g. $\bar{k}_1\bar{h}<\pi$, a decrease of the noise reduction performance may be seen. In fact, this is somewhat expected. Compared with a sawtooth serration with uniform slope magnitude, a change in the slope distribution causes the phase patterns along the edge to be less uniform, resulting in a less effective destructive interference at relatively low frequencies, hence a poorer noise reduction performance. For example, when $\Delta$ takes an intermediate value of π, a perfect destructive interference is expected to occur on the edge of a sawtooth serration, hence a large noise reduction around this frequency. On the other hand, at the same frequency, due to the non-linear variation of F(η) for the new serration type, a perfect cancellation is not possible, and hence a poorer noise reduction arises. However, as frequency increases, the advantage of this new type of serration will quickly overtake.

An example serration profile that is piecewise smooth with no stationary points and that is sharper in the local vicinity of non-smooth points is proposed, given by $$F(\eta) = \begin{cases} \frac{1}{\tan\frac{b}{4}} \tan(bx), & 0 \leq \eta < \frac{1}{4} \\ \frac{1}{\tan\frac{b}{4}} \tan\left(b\left(-x+\frac{1}{2}\right)\right), & \frac{1}{4} \leq \eta < \frac{3}{4} \\ \frac{1}{\tan\frac{b}{4}} \tan\left(b\left(x-\frac{3}{4}\right)\right), & \frac{3}{4} \leq \eta \leq 1 \end{cases} \quad (37)$$

where b is a non-negative number quantifying how sharp the serration is at the non-smooth points. For example, when b→0, the serration reduces to the sawtooth serration. When b→2π, the slope at the non-smooth points approaches infinity. This case should be avoided, since when b→2π, the slope near η=0 approaches 0, i.e. η=0 tends to a stationary point (stationary point of inflection), which has been determined above to be non-ideal. An intermediate value is desirable, for example, b=1.5π. Profiles of different b values are shown in FIG. 2. It can be seen that when b=1.8π, the profile becomes highly non-uniform; in particular, the slope at the non-smooth points is very large and at η=0 the slope is close to 0.

To illustrate the potential advantage of using the new type of serration, $10 \log 10|E_0(0)|^2$ is plotted in FIG. 3. It can be seen that, as $\Delta \to \infty$, the value of $|E_0|$ does indeed decay more quickly compared to that for the sawtooth serration. The extra noise reduction is up to 10 dB.

As another illustration, $10 \log 10|E_2(0)|^2$ is plotted in FIG. 4. Comparing with FIG. 3, it is observed that the compromised frequency regime starts to shift to a higher frequency. Indeed, this can be shown to be generally true when the mode number n increases. However, in practical applications, the serration wavelength is small, therefore the n-th-order mode are cut-on only when $k_2$ is close to $-2n\pi$. But when $k_2$ becomes large, the incoming turbulent wavenumber spectrum decays. Hence only a finite number of modes N are practically needed in the frequency range of interest and N decreases as the frequency decreases. As a fixed frequency, it can be shown that N decreases when the serration wavelength decreases from, for example, the spectrum model shown in the following section.

Consequently, to maximize the noise reduction benefit, a small serration wavelength is desirable. This will be further demonstrated in the following section. It should be noted that when the frequency is extremely high, the number of cut-on modes N might be large enough such that the additional advantage of the using this new serration is buried by the compromised modes.

However, in practical applications, sound intensity at these extremely large frequencies is often negligible, consequently only the intermediate-to-high frequency range ($\pi < k_1 h < 100$ for example) is of interest, which is where the benefits do exist. The high end of the frequency range where an improved acoustic performance is possible depends on how quickly the turbulent spectrum decays with $k_2$.

Although this analysis is based on one observer point at $\theta = \pi/2$, it can be shown that the analysis also serves as a good approximation at other $\theta$ values. For example, considering the expression:

$$E_n(-\kappa_n \cos\theta) = \int_0^1 e^{i(\ddot{k}_1 - \kappa_n \cos\theta)hF(\eta)} e^{i2n\pi\eta} d\eta \qquad (38)$$

It is only necessary to replace $\Delta = \ddot{k}_1 - K_n \cos\theta$ and the previous asymptotic analysis would still hold, because of the interest only in the cut-on modes where $K_n$ is a real number less than $\ddot{k}$.

It is shown above that the new type of serration results in a reduced value of $|E_n(0)|^2$ at high frequencies. However because there are multiple cut-on modes, it is still not clear exactly how much additional benefit can be expected by using the new type of serration and what the most effective frequency range is. In the analysis below, the overall benefit is predicted by using a realistic wavenumber spectrum to model the incoming turbulence.

There are many empirical models for the incoming turbulent spectrum available. As an illustration, the one developed from the Von Kármán spectrum is used. Based on this, it can be shown that $\Phi_{ww}$, which is the energy spectrum of the incoming vertical fluctuation velocity, can be written as:

$$\Phi_{ww}(\omega, k_2) = \frac{4TI^2}{9\pi k_e^2} \frac{\hat{k}_1^2 + \hat{k}_2^2}{(1 + \hat{k}_1^2 + \hat{k}_2^2)^{7/3}}, \qquad (39)$$

where TI denotes the turbulent intensity and $k_e$, $\hat{k}_1$, and $\hat{k}_2$ are given by $$k_e = \frac{\sqrt{\pi} \, \Gamma(5/6)}{L_t \Gamma(1/3)}, \hat{k}_1 = \frac{k_1}{k_e}, \hat{k}_2 = \frac{k_2}{k_e}. \qquad (40)$$

In the above equations, $L_t$ is the integral scale of the turbulence (also normalized by the serration wavelength) and $\Gamma(x)$ is the Gamma function.

In order to put equation 39 into perspective, a realistic set of physical parameters for the incoming flow is needed. In this case, the following parameters are used: M=0.18 and TI=0.025, which are the same parameters as have been used in previous experiments and previous studies.

In order to show the effects of serration wavelength, h is varied from 2 to 10, corresponding to $L_t$ from 0.5 to 2.5. In the context of dimensional variables, this corresponds to the case where one fixes the serration amplitude and decreases the serration wavelength. In the rest of this section, the observer location is fixed at r=30, $\theta = \pi/2$ and y=0 and the far-field power-spectral densities (PSDs) are evaluated from equation 27.

FIG. 5 shows the far-field PSDs for flat plates with straight edge, sawtooth and the illustrative serrations of h=2 and b=1.4$\pi$, respectively. This results in quite wide serrations. As discussed above, wide serrations imply that more modes need to be considered. Consequently, the additional benefit may not be obtained due to the inclusion of high-order modes. This is in accord with the results shown in FIG. 5, where the advantage is negligible in the frequency range of interest. However, it is worth noting that if the value of b is decreased, then the advantages of using this new serration may be more pronounced. In either case, however, the benefit of using such a new type of serration is not significant at these parameters.

In order to allow an improved sound reduction to occur in the frequency range of interest, sharper serrations should be used. When the serration amplitude is fixed, a small serration wavelength implies a large value of h.

FIG. 6 shows the results when h=5. Compared to FIG. 5, the benefit of using the illustrative profile starts to appear at $k_1 h \approx 4$ and last until $k_1 h \infty 100$. An extra 4 dB is achieved compared to the traditional sawtooth serration in the intermediate frequency range. It is worth noting that the predicted spectrum starts to oscillate. This is because the far-field sound is dominated by mode 0 when the serration wavelength is small. The peaks and troughs are due to the behaviour of $|E_0(0)|$.

FIG. 7 shows that a larger acoustic benefit can be obtained for even sharper serrations, where h$\approx$10. A nearly uniform 8 dB extra reduction is achieved by using the new design when $5 < k_1 h < 50$. When the frequency is higher than $k_1 h = 50$, the benefit of using the new serration starts to diminish. As mentioned in the preceding section, this is due to the fact that more modes are now cut-on and the advantage is limited by the compromised modes. Comparing FIGS. 5 to 7, the $k_1 h$ quanity ($\ddot{k}_1 \ddot{h}$, to be more precise) can be found to be the correct nondimensional quantity characterizing the noise reduction effects of serrations. This is evident from equation 28. In summary, the proposed illustrative design does result in a better noise reduction performance in the frequency range of interest. However, in order to gain the full advantage of the new design, the serration must be sufficiently sharp. The low-frequency increase in noise reduction caused by using the new design not as significant.

Experimental Validation

The analysis above shows that the use of the new serration profile can provide up to 8 dB more noise reduction in the high frequency range without severely affecting the low-frequency performance. In the discussion below, this conclusion is experimentally verified.

The experiment was carried out in the aeroacoustics facility in the University of Southampton, UK; a schematic diagram of the rig is shown in FIG. 8. The experimental rig was placed inside an anechoic chamber of dimensions 8 m×8 m×8 m (denoted by reference 'D'). The anechoic chamber has a cut-off frequency around 80 Hz. The low-speed wind tunnel (denoted by reference 'A') can go up to a Mach number around 0.3. In the experiment, the jet velocities were varied between 20, 40, 60 and 80 m/s. The exit of the wind tunnel has a dimension of 150 mm×450 mm.

A number of flat plates with a mean chord length 150 mm and span 450 mm were placed at 150 mm (denoted by reference 'B') downstream of the wind tunnel exit. The flat plates were constructed by joining together two 1 mm thick metallic sheets to allow serrated flat-plate inserts to be inserted between them. All corners of the plates were rounded and the trailing edge was sharpened to eliminate vortex shedding noise. More details of the construction of these flat plates is shown in Narayan et al (Narayanan, S., Chaitanya, P., Haeri, S., Joseph, P., Kim, J. W. & Polacsek, C., "Airfoil noise reductions through leading edges serrations". Physics of Fluids vol. 27, 2015, incorporated by reference in its entirety into the present disclosure). The flat plates used in the experiment included those with a straight leading edge and serrated leading edges of various profile parameters by varying b and h. The serration wavelength was also varied independently. To prevent tonal noise generation due to the Tollmien-Schlichting waves convecting in the laminar boundary layer, the flow near the leading edge of the flat plate was tripped on both the pressure and suction sides to force transition to turbulence using a rough band of tape. The tape had a width of 1.25 cm and was located at 16.6% of the chord from the leading edge. The tape was 'Anti-Slip Tape SS #100 Standard Grade' marketed by 'Stop Slip Ltd' of Rochester, UK, and had a surface roughness of 140 µm. Previous noise measurements in this facility have indicated that self-noise is insensitive to the this type of tripping.

A microphone arc (denoted by reference 'C') was placed above the aerofoil to measure the far-field noise at different angles in the mid-span plane. The microphone arc has 11, 1.27 cm condenser microphones (Brüel & Kjr TYPE 4189) located at a constant radial distance of 1.2 m from the leading edge of the flat plate, spanning an observer angle from 40° to 140° measured relative to the downstream jet axis. Noise measurements were carried out for 10 s at a sample frequency of 50 kHz. The noise spectra were calculated with a window size of 1024 data points corresponding to a frequency resolution of 48.83 Hz and a BT product of approximately 500, which is sufficient to ensure negligible variance in the spectral estimate at this frequency resolution. The noise spectra are presented in terms of the Sound Power Level (PWL) and Sound Pressure Level (SPL) using the procedure described by Narayan et al.

A bi-planar rectangular grid with overall dimensions of 630 mm×690 mm was used to generate nearly homogeneous turbulence. The grid was located in the contraction section of the wind tunnel at 75 cm upstream the nozzle exit. Turbulence generated using this grid provided a velocity spectrum at the leading edge of the plate that is a close approximation to that due to homogeneous and isotropic turbulence, the energy spectrum of which being known to be well modelled by a number of empirical formula. The aforementioned one based on the Von Kármán spectrum is used to model the energy spectrum for the vertical fluctuation velocity. In this experiment, the turbulence intensity was around 2.5% and the stream-wise integral length-scale was around 6 mm.

The far-field sound spectra are presented using the PWL. PWL is defined to describe the sound power spectral density integrated over the observer angle. A detailed definition of PWL is given by equation 4 of Narayan et al.

The first test case is for serrations with a wavelength 5 mm and half root-to-tip amplitude 25 mm, corresponding to h=h*/λ*=5, at a jet velocity 60 m/s. The value of b is varied between 0, π, 1.2π and 1.5π, respectively. Also included is the baseline test, where no serration is used, and the self-noise test, where the serration of b=1.5π is used without grid turbulence. The results are shown in FIG. 9. The self-noise spectrum (i.e. noise generated by mechanisms other than leading edge noise) is shown by the dashed line and is obtained without the grid in place.

It can be seen that from the frequency $k_1h \approx 0$ to 10, the leading-edge noise from the baseline test case is at least 15 dB higher than the self-noise.

The measured noise can therefore be confidently regarded as due to the interaction between the leading edge and grid turbulence in this frequency range. As the frequency increases, care must be taken as the self-noise becomes more and more important, and in particular, when leading-edge noise is reduced significantly by using serrations, the total noise would be dominated by the self-noise. The self-noise consists of a number of sources, including the turbulent boundary layer trailing-edge (TE) noise, flat plate tip noise and so on, among which TE noise is likely to be dominant.

As discussed above, b=0 implies that the serration reduces to a conventional sawtooth profile. FIG. 9 shows that the use of the conventional sawtooth serration leads to significant noise reduction in the frequency range $k_1h > 1$, which is consistent with earlier findings.

However, it is of more interest to see whether a greater reduction can be achieved by using the new serration profile with b>0. FIG. 9 demonstrates that this indeed can be achieved. For example, for the case where b=1.5π, an additional sound reduction up to 7 dB is observed in the experiment with little effect on the low-frequency performance.

The additional benefit vanishes for frequencies larger than $k_1h=20$. This is because the self-noise mechanisms, such as the aforementioned TE noise, start to dominant.

Hence, although the leading-edge noise is reduced more effectively, this is hidden by the dominance of TE noise.

FIG. 9 also confirms that the larger b is, the more benefit can be expected. For instance, for b=π, 1.25π and 1.5π, the additional reduction is around 2 dB, 3 dB and 7 dB, respectively, which agrees with the predictions made by the analysis set out above.

The second test case is for a serration wavelength 5 mm and half root-to-tip amplitude h equal to 12 mm. This corresponds to the value h=2.4. The results are shown in FIG. 10. Due to a smaller value of h, the effective (where the self-noise is negligible) nondimensional frequency ($k_1h$) range is now shifted to a lower regime. Also it can be seen that the maximum additional benefit in the frequency range of interest is around 4 dB. This is consistent with the conclusions set out above, i.e. in order to achieve great benefit in the frequency range of interest, the serration must be sufficiently sharp (large h).

To investigate the additional benefit this new serration introduces compared to the existing sawtooth serration, the ΔSPL spectra (obtained by subtracting the spectra for the new serration from those for the sawtooth serration) is compared at 90° above the flat plate in the mid-span plane. Three serration profiles are chosen, all of which have the same wavelength of 5 mm and half root-to-tip amplitude 25 mm. The first is the conventional sawtooth serration, i.e. b=0, while the second and third are the new serration profiles with b=π and 1.5π, respectively. Results are shown in FIG. 11. Only the intermediate-to-high frequency range is shown because the low frequency part is dominated by jet noise.

The results show that, when the new type of serration is used, additional benefit is obtained. When b=π, this additional benefit is around 2 dB, and is most effective in the intermediate frequency range, i.e. $3<k_1h<20$. The predicted value is slightly larger than this value, and the spectrum is oscillatory. This is partly because no average operation was performed on the predicted narrow-band spectrum while, in the experiment, this was performed with a frequency resolution of 48.83 Hz, and partly because the model assumes an infinite span, which would result in more effective interference. Nevertheless, the predicted mean value agrees well with the experimental result. When $k_1h>15$, the predicted benefit is still around 2 dB, but this is not echoed by the experimental results due to the dominance of self-noise. When the parameter b=1.25π, the observed additional sound reduction is around 3 to 4 dB for $3<k_1h<20$. Because of the same reasons mentioned above, the predicted spectrum is also oscillatory and slightly larger than the observed value in this frequency range. The tendency of larger benefit for larger value of b is, however, well predicted by the model. In a similar manner, the experimental data in the high frequency regime does not reveal any meaningful physics due to the dominance of self-noise.

Wiener-Hopf Procedure (Used in Theoretical Analysis Above)

The Wiener-Hopf procedure can be performed as follows. First, when $\zeta=0$ one has $$\tilde{\Phi}'(s, \eta, \zeta)|_{\zeta=0} = \sum_{n=-\infty}^{\infty} -\gamma_n A_n(s) e^{-ishF(\eta)} e^{i\chi_n \eta}, \quad (41)$$

and $$\tilde{\Phi}(s, \eta, \zeta)|_{\zeta=0} = \sum_{n=-\infty}^{\infty} A_n(s) e^{-ishF(\eta)} e^{i\chi_n \eta}, \quad (42)$$

where by definition $\tilde{\Phi}'=\partial\tilde{\Phi}/\partial\zeta$ for simplicity.

From the boundary conditions of equations 7 and 8 above:

$$\tilde{\Phi}'(s, \eta, \zeta)|_{\zeta=0} = \frac{\omega_0}{i(s+\ddot{k}_1)} e^{i\ddot{k}_1 hF(\eta)+\kappa_2 \eta} + \tilde{\Phi}'_{-}, \quad (43)$$

and $$\tilde{\Phi}|_{\zeta=0} = \tilde{\Phi}_+ \quad (44)$$

where the + and − subscripts indicate that the corresponding functions are analytic in the upper and lower s planes, respectively.

Comparing equations 41 and 43 and equations 42 and 44, it can be shown that $$-\gamma_n A_n(s) = \frac{\omega_0}{i(s+\ddot{k}_1)} E_n(s) + \tilde{\Phi}'_{n-} \quad (45)$$

and $$A_n(s) = \tilde{\Phi}_{n+} \quad (46)$$

where $$E_n(s) = \int_0^1 e^{i(\ddot{k}_1+s)hF(\eta)} e^{-i2n\pi\eta} d\eta. \quad (47)$$

The functions $\tilde{\Phi}'_{n-}$ and $\tilde{\Phi}_{n+}$ are defined in a similar manner and still preserve their analyticity in their own half planes. Combining equations 45 and 46, the following is obtained:

$$\gamma_n \tilde{\Phi}_{n+} + \tilde{\Phi}'_{n-} + \frac{-\omega_0}{i(s+\ddot{k}_1)} E_n(s). \quad (48)$$

The kernel decomposition is standard, using which equation 48 can be written as $$\sqrt{s+\kappa_n} \cdot \tilde{\Phi}_{n+} + \frac{\tilde{\Phi}'_{n-}}{\sqrt{s-\kappa_n}} = \quad (49)$$

-continued $$-\omega_0 E_n(s) \left[ \frac{1}{i(s+\ddot{k}_1)\sqrt{s-\kappa_n}} - \frac{1}{i(s+\ddot{k}_1)\sqrt{-\ddot{k}_1-\kappa_n}} \right] - \frac{\omega_0 E_n(s)}{i(s+\ddot{k}_1)\sqrt{-\ddot{k}_1-\kappa_n}}$$

Routine procedure yields $$A_n(s) = \tilde{\Phi}_{n+} = \frac{i\omega_0 E_n(s)}{(s+\ddot{k}_1)\sqrt{s+\kappa_n}\sqrt{-\ddot{k}_1-\kappa_n}} \quad (50)$$

Substituting equation 50 into equation 12 yields $$\tilde{\Phi}(s, \eta, \zeta) = \quad (51)$$

$$\sum_{-\infty}^{\infty} \left( \frac{i\omega_0 E_n(s)}{(s+\ddot{k}_1)\sqrt{s+\kappa_n}\sqrt{-\ddot{k}_1-\kappa_n}} \cdot \operatorname{sgn}(\zeta) \cdot e^{-\gamma_n |\zeta|} \cdot e^{-ishF(\eta)} \cdot e^{i\chi_n \eta} \right)$$

Method of Steepest Descent (Used in Mathematical Analysis Above)

In the far-field, equation 51 can be inverted using the method of steepest descent as follows. When $K_n$ is real, such as when n=0, the Fourier transform in the far-field is inverted with the deformed path shown in FIG. 12. When $K_n$ is imaginary, the integral path is deformed to that shown in FIG. 13.

In both FIG. 12 and FIG. 13, the dashed paths $\Sigma_1$ and $\Sigma_3$ are arcs of a large radius R. It can be shown that the integral over path segments $\Sigma_1$ and $\Sigma_3$ vanish when the R→∞. The paths segment $\Sigma_2$ are hyperbolas given by $$s = -\kappa_n \cosh(i\theta + t), \quad (52)$$

where the real argument t ranges from −∞ to ∞ and ∞ is defined as the azimuthal angle in the x-z plane, i.e.

$$x = \xi + hF(\eta) = r\cos\theta, \; z = r\sin\theta, \quad (53)$$

where $r = \sqrt{x^2 + z^2}$.

Therefore the inversion of the Fourier transform becomes $$\Phi(\xi, \eta, \zeta) = \frac{1}{2\pi} \sum_{n=-\infty}^{\infty} \left( \frac{i\omega_0 \operatorname{sgn}(\zeta) e^{i\chi_n \eta}}{\sqrt{-\ddot{k}_1-\kappa_n}} \cdot \int_{\Sigma_2} \frac{E_n(s)}{(s+\ddot{k}_1)\sqrt{s+\kappa_n}} \cdot e^{\gamma_n|\zeta|-is(\xi+hF(\eta))} \cdot ds \right) \quad (54)$$

Substituting equation 52 yields $$\Phi(\xi, \eta, \zeta) = \frac{1}{2\pi} \sum_{n=-\infty}^{\infty} \left( \frac{i\omega_0 \, \text{sgn}(\zeta) e^{i\chi_n \eta}}{\sqrt{-\bar{k}_1 - \kappa_n}} \cdot \right. \tag{55}$$

$$\int_{\Sigma_2} \frac{E_n(-\kappa_n \cosh(i\theta + t))}{(-\kappa_n \cosh(i\theta + t) + \bar{k}_1)\sqrt{-\kappa_n \cosh(i\theta + t) + \kappa_n}} \cdot$$

$$\left. e^{i\kappa_n r \cosh t} \cdot dt \right)$$

In the far-field, equation 55 can be evaluated using the method of steepest descent to be $$\Phi(r, \theta, y) = \tag{56}$$

$$\sum_{n=-\infty}^{\infty} \frac{e^{i\pi/4}}{\sqrt{\pi}} \cdot \frac{e^{i\kappa_n r}}{\sqrt{r}} \cdot \cos\frac{\theta}{2} \cdot \frac{\omega_0 E_n(-\kappa_n \cos \theta)}{(-\kappa_n \cos \theta + \bar{k}_1)\sqrt{-\bar{k}_1 - \kappa_n}} \cdot e^{i\chi_n y}$$

BRIEF DESCRIPTION OF DRAWINGS

The invention will be described in more detail by way of example with reference to the accompanying drawings, in which.

DETAILED DESCRIPTION

Example foils embodying aspects of the disclosure will now be described with reference to FIGS. 14 to 27.

In these examples the serrations will be described in the context of aerofoils, taken to include wings, propeller and fan blades, turbine elements such as rotor blades, stator blades, where generally the fluid is air or at least gaseous. But the principles apply equally to other fluids including liquids such as water, either for hydrofoils or hydroplanes for example, or propellers and turbine machinery for use in water, or indeed for foils for use in a fluid of multiple phases. Thus, the features demonstrated by these aerofoil embodiments may also be incorporated into non-aerofoil embodiments while embodying aspects of this disclosure.

Figure 1:
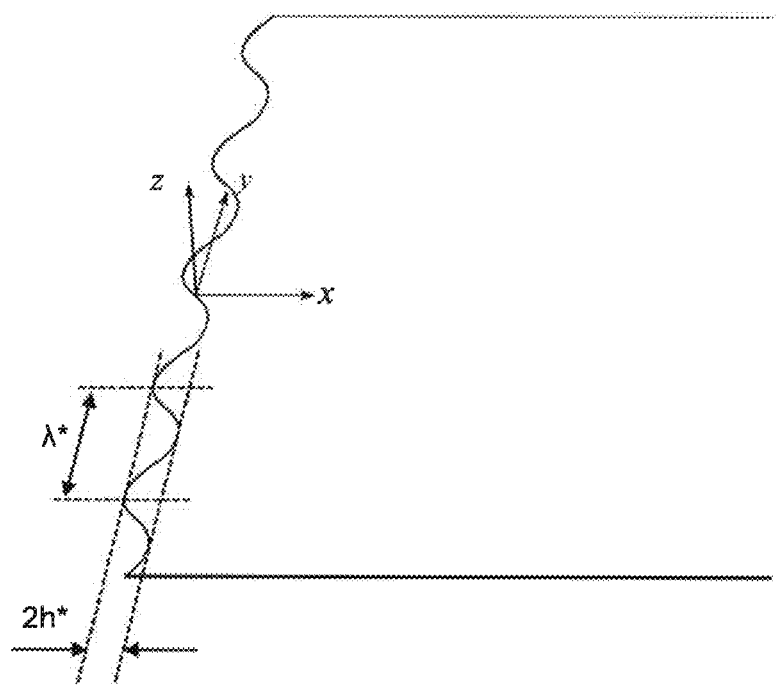
FIG. 1 is a schematic illustration of a leading-edge serration and the co-ordinate transformation.
Figure 2:
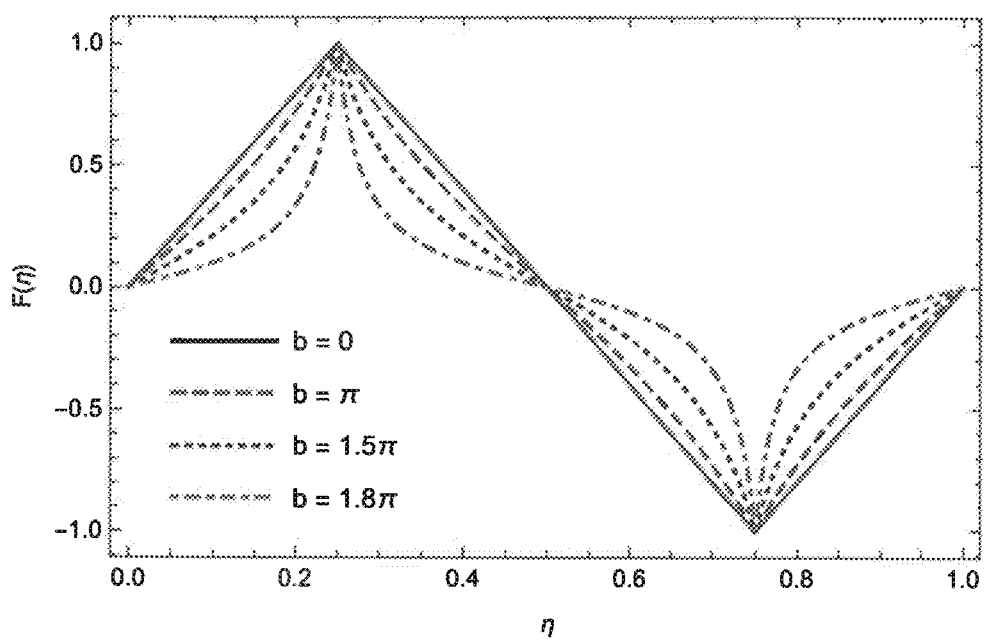
FIG. 2 is a plot of serration profiles including a sawtooth profile and profiles according to aspects of this disclosure.
Figure 3:
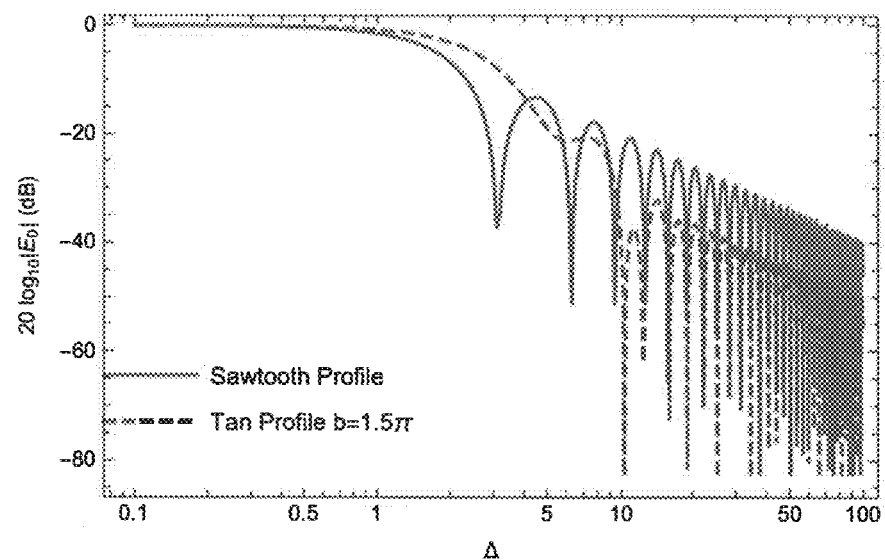
FIG. 3 is a plot of decay rates of leading-order noise terms for a sawtooth profile and a profile according to aspects of this disclosure.
Figure 4:
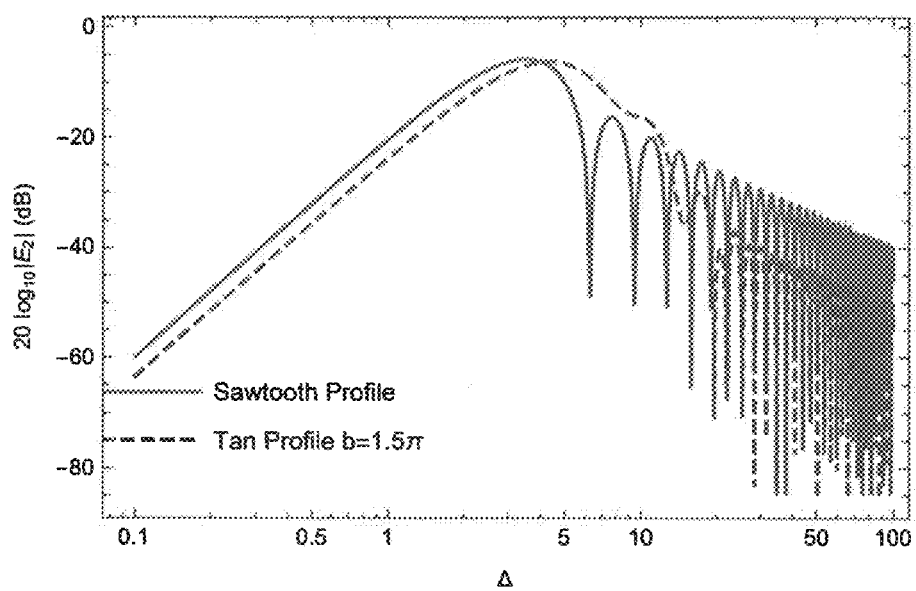
FIG. 4 is a plot of decay rates of further noise terms for a sawtooth profile and a profile according to aspects of this disclosure.
Figure 5:
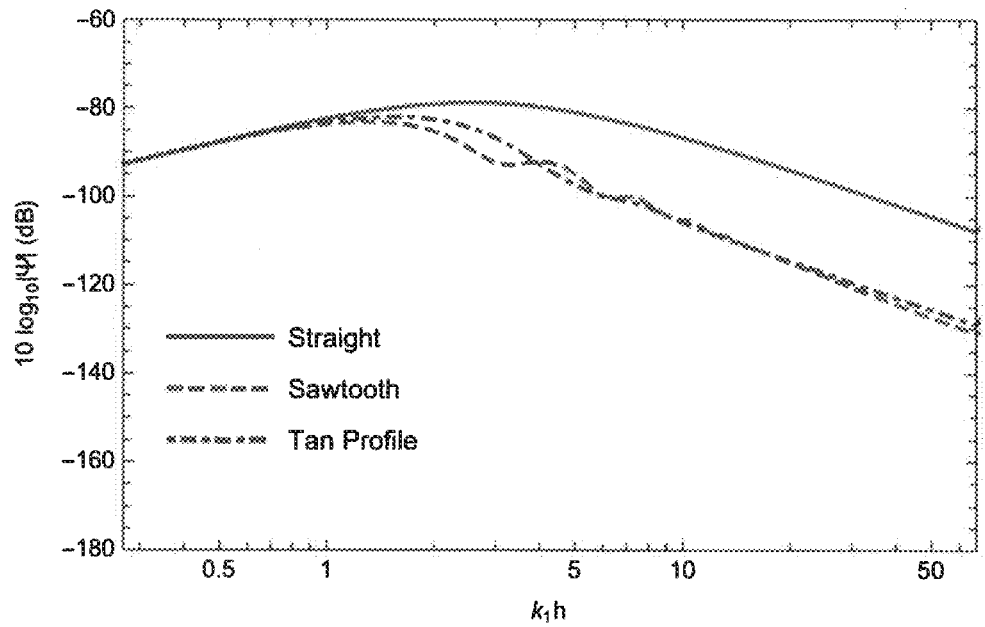
FIG. 5 is a plot predicted far-field PSD for flat plates with straight edge, sawtooth profile with wide serrations and a profile according to aspects of this disclosure with wide serrations.
Figure 6:
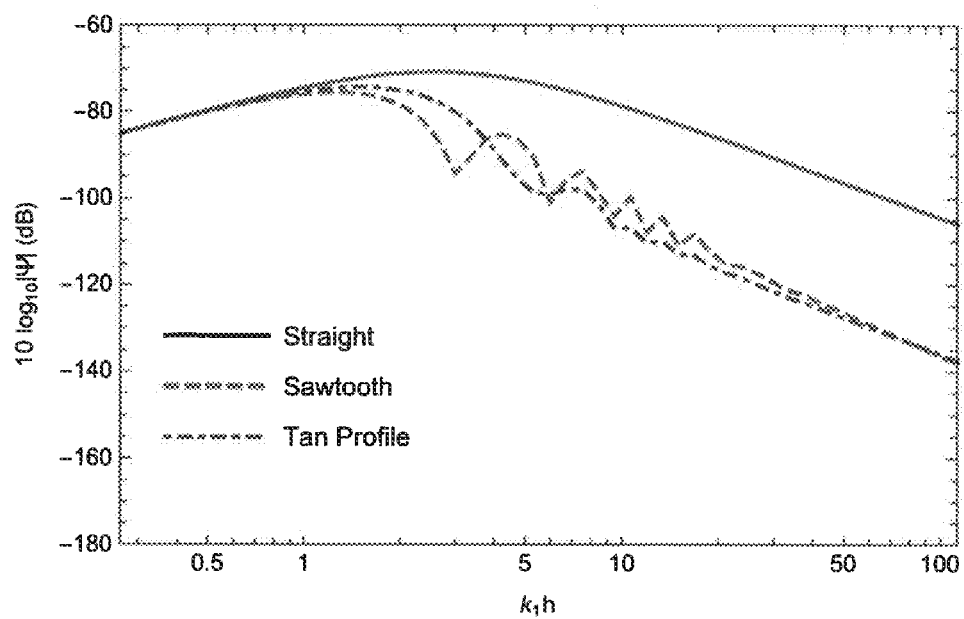
FIG. 6 is a plot predicted far-field PSD for flat plates with straight edge, sawtooth profile with sharp serrations and a profile according to aspects of this disclosure with sharp serrations.
Figure 7:
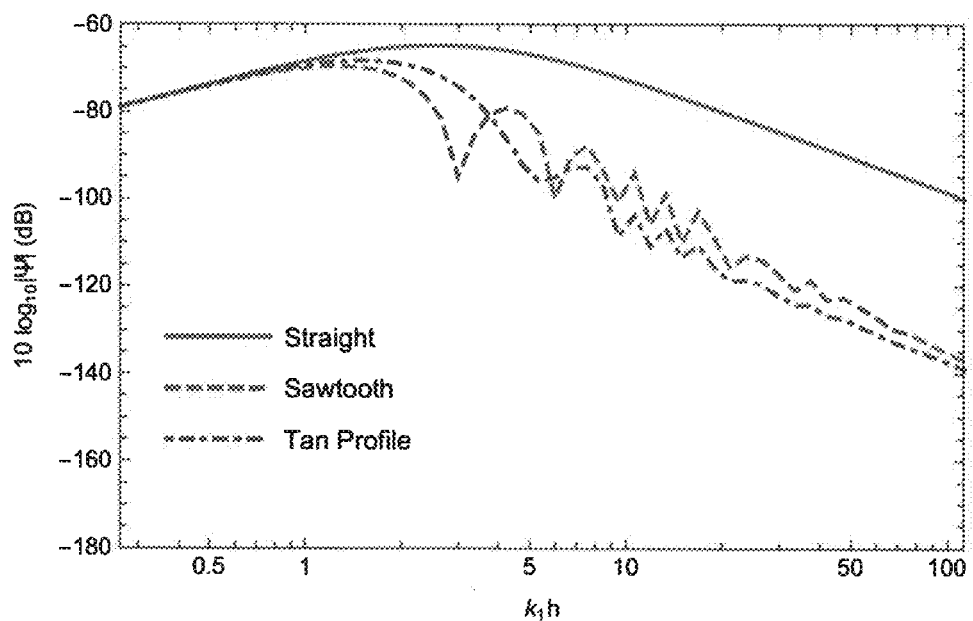
FIG. 7 is a plot predicted far-field PSD for flat plates with straight edge, sawtooth profile with very sharp serrations and a profile according to aspects of this disclosure with very sharp serrations.
Figure 8:
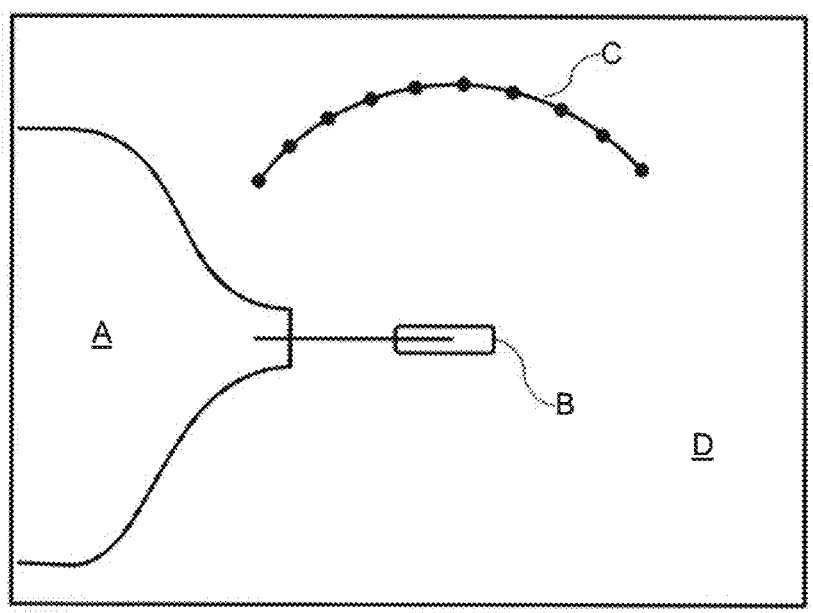
FIG. 8 is a schematic diagram of the experimental setup used to obtain measurements of far-field noise for aerofoil configurations.
Figure 9:
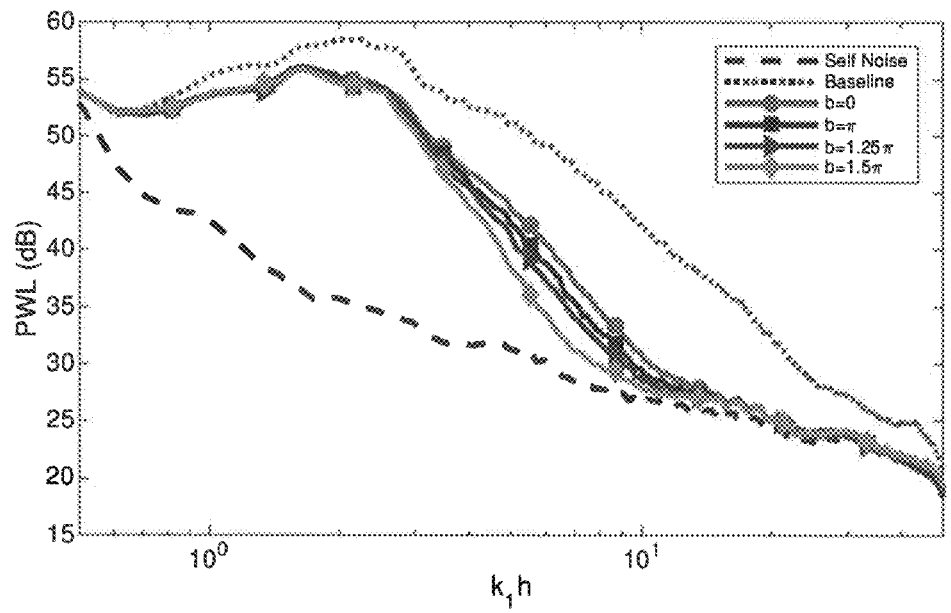
FIG. 9 is a first plot of noise power level at the far-field, for serrations of height given by h=h*/λ*=5.
Figure 10:
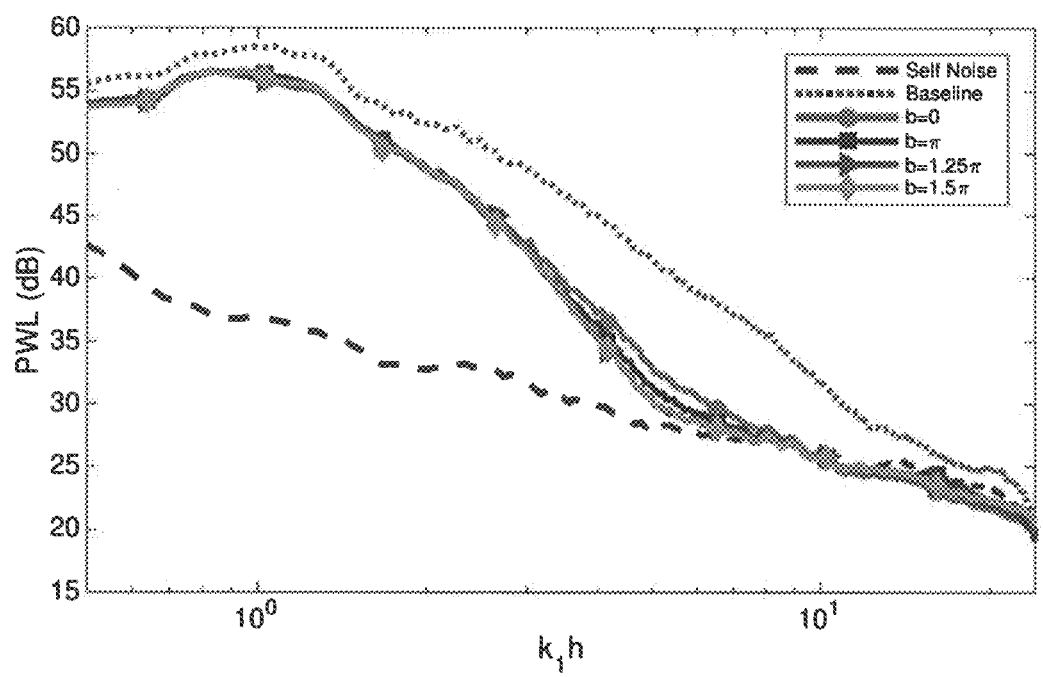
FIG. 10 is a first plot of noise power level at the far-field, for serrations of height given by h=h*/λ*=2.4.
Figure 11:
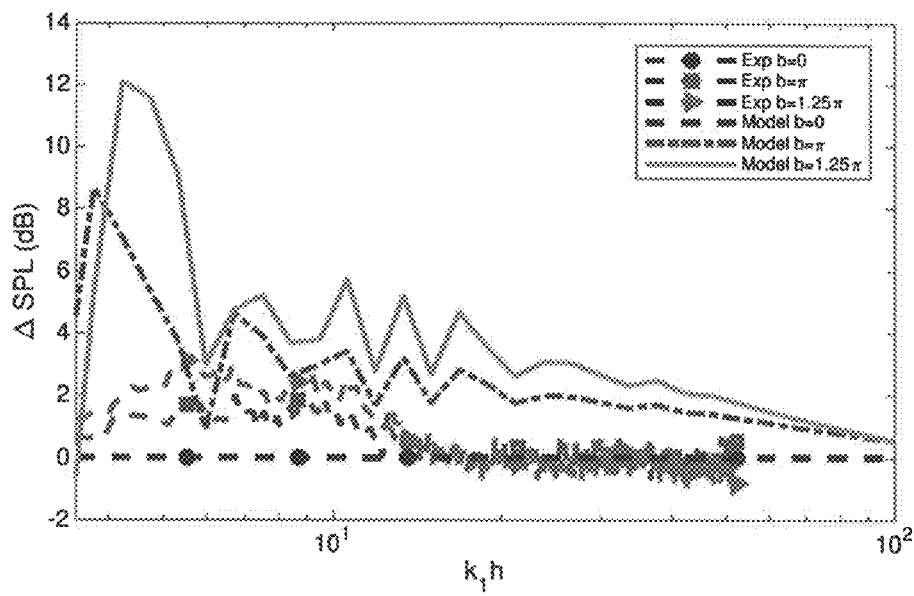
FIG. 11 is a first plot of noise power level at the far-field, for serrations of height given by h=h*/λ*=2.5.
Figure 12:
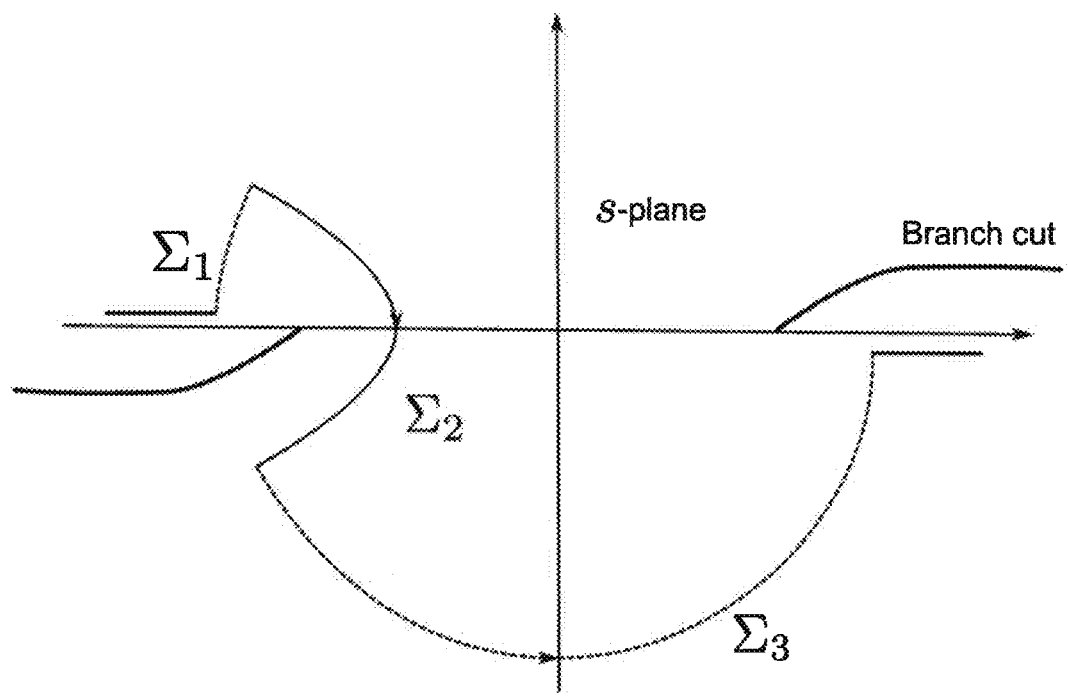
FIG. 12 is a plot of a 'deformed path' used in the inversion of a Fourier transform in the far field for use with real values of $\kappa_n$.
Figure 13:
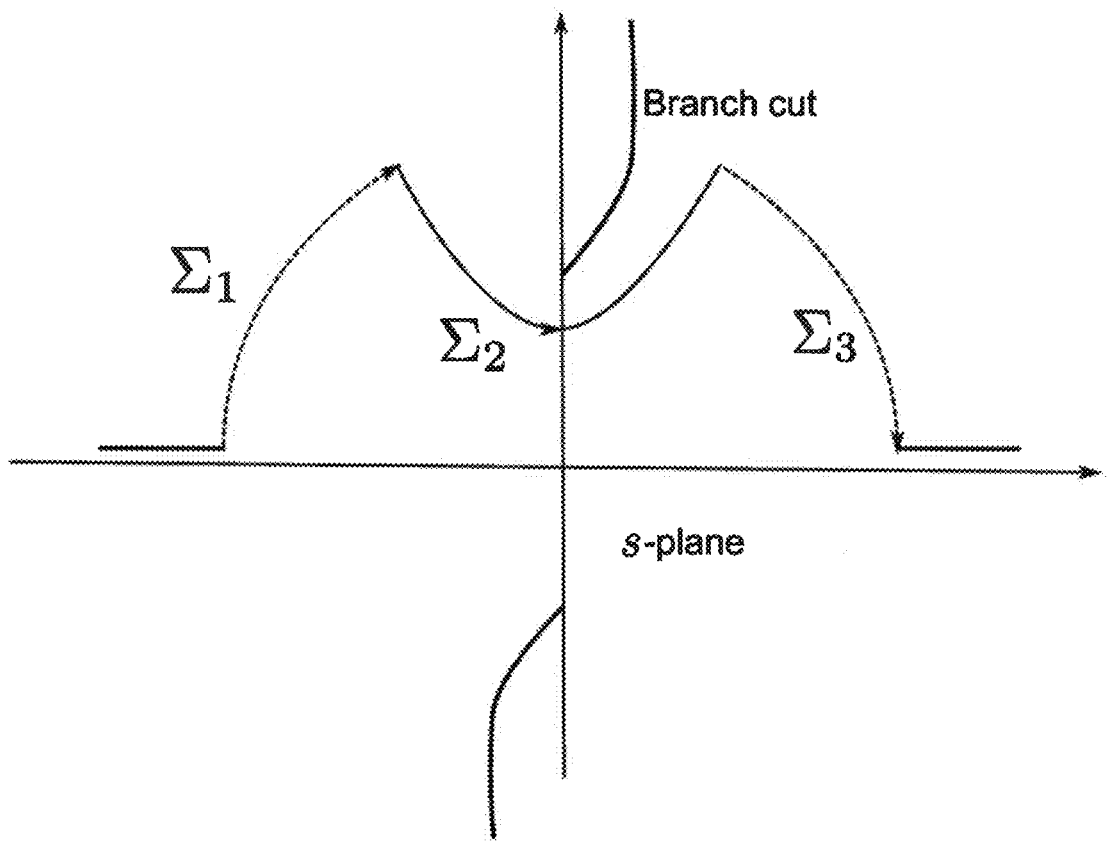
FIG. 13 is a plot of a 'deformed path' used in the inversion of a Fourier transform in the far field for use with imaginary values of $\kappa_n$.
Figure 14:
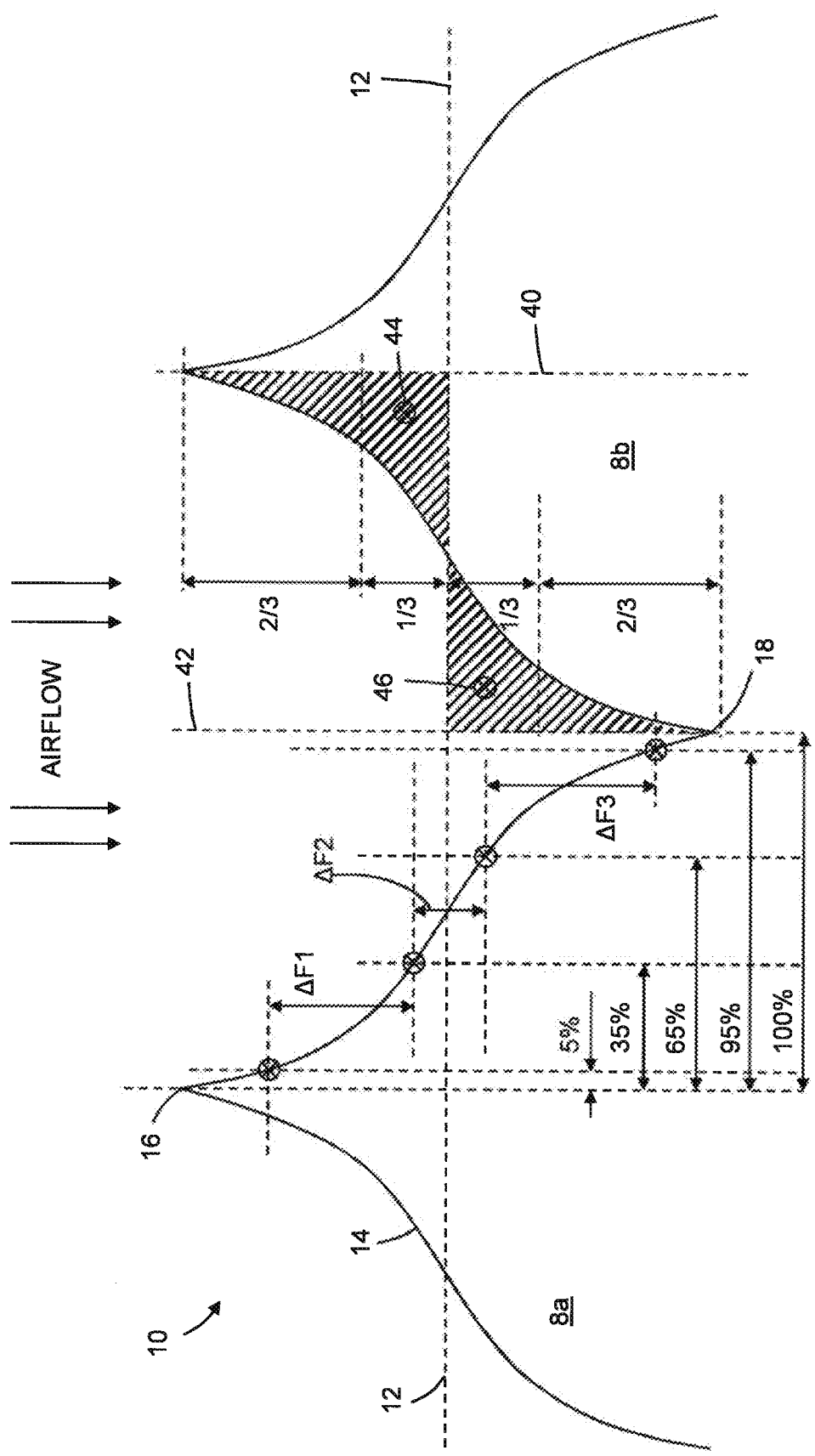
FIG. 14 illustrates a serrated portion of the leading edge of an aerofoil embodying an aspect of the disclosure, the edges of the teeth following an ogee-shaped curve.

FIG. 14 illustrates a serrated portion 10 of the leading edge of an aerofoil embodying an aspect of the disclosure. A portion 10 of the leading edge of an aerofoil is provided with serrations, the serrations comprising a plurality of teeth 8a, 8b. The teeth 8a, 8b adjoin each other. The presence of the serrations causes the profile of the leading edge to deviate from a nominal baseline 12 represented in FIG. 14 by a dotted line extending horizontally across the teeth. The base line edge is shown extending in a span-wise direction, horizontal in the drawing, with the (mean) air flow being directed downward, this being a stream-wise direction. The aerofoil itself is defined according to its chord-wise direction which in this case is parallel to the mean air flow direction and the span-wise direction.

While FIG. 14 shows two teeth 8a, 8b, the leading edge of the aerofoil may include one or more regions of serrations, each including one or more teeth. Considering for now the first tooth 8a, the tooth 8a profile may be defined by its tip point 16 and an adjacent root point 18 at which the first tooth 8a adjoins the second tooth 8b, the adjacent root point 18 being shared by the first tooth 8a and the second tooth 8b.

The tip point 16 of the first tooth 8a represents a sharp point that is a local maximum chord-wise extent of the aerofoil at this location on the leading edge. Because the tooth is on the leading edge, the tip point 16 it is the most up-stream portion of the tooth.

The root point 18 shared by the first tooth 8a and the second tooth 8b represents a local minimum chord-wise extent of the aerofoil at this location on the leading edge. On either side of the root point 18, the edges 14 of tooth 8a and of tooth 8b extend further, chord-wise from the aerofoil. Because the tooth is on the leading edge, the root-point 18 is the most down-stream portion of the tooth edge 14.

The edge 14 of the tooth 8a between tip point 16 and root point 18 follows a smooth ogee-like curve, whereby there is an inflection located around the mid-point, span-wise, between the tip point 16 and the root point 18. The edge 14 of the tooth is particularly sharp at the tip point and at the root point 18, in that the gradient or slope, defined as the change in chord-wise position of the tooth edge 14 with change in span-wise position of the tooth edge 14, is higher in the neighbourhood of the tip point 16 and in the neighbourhood of the root point 18 than at locations away from tip point 16 and root point 18, i.e. at intermediate locations between the tip point 16 and root point 18.

Therefore there are no stationary points in the tooth edge profile 14 between the tip point 16 and the root point 18 (i.e. locations in which the tangent to the tooth edge profile 14 is normal to the chord-wise direction) and the 'sharpness', or gradient of the tooth edge profile 14, is focused at the tip point 16 and root point 18.

Based on the analysis and experimental results presented earlier, a leading edge including a serrated portion having teeth with edge profiles 14 as per teeth 8a and teeth 8b results in greater noise reduction compared with sinusoidal or sawtooth serrations of similar dimensions.

While tooth 8a has maximum gradients at the tip point 16 and root point 18, it is not strictly required that the gradient increase continuously from the mid-point to the tip point 16 or root point 18, just that the gradient is higher in the neighbourhoods of the tip point 16 and root point 18.

FIG. 14 shows the tooth 8a split into 5 regions span-wise between tip point 16 and root point 18. The first region represents the section of the tooth 8a from the tip point 16 up to a boundary 5% of the span-wise distance from the tip point 16 to the root point 18. The second region represents the section of the tooth 8a from the boundary at 5% of the span-wise distance from the tip point 16 to the root point 18 to a further boundary at 35% of the span-wise distance from the tip point 16 to the root point 18. The third region represents the section of the tooth 8a from the boundary at 35% of the span-wise distance from the tip point 16 to the root point 18 to a further boundary at 65% of the span-wise distance from the tip point 16 to the root point 18. The fourth region represents the section of the tooth 8a from the boundary at 65% of the span-wise distance from the tip point 16 to the root point 18 to a further boundary at 95% of the span-wise distance from the tip point 16 to the root point 18. The fifth region represents the section of the tooth 8a to the root point 18 from the boundary at 95% of the span-wise distance from the tip point 16 to the root point 18.

Because the gradient in the neighbourhood of the tip point 16—the first region 0%-5% the second region 5%-35%—% and the gradient in the neighbourhood of the root point 18—the fourth region 65%-95% and the fifth region 95%-100%—are higher than the gradient away from the tip point 16 and the root point 18—the third region 35%-65%—then the average gradient in the third region is lower than the average gradient in the first region and the average gradient in the second region and the average gradient in the fourth region and the average gradient in the fifth region.

Since the average gradient between two points on a curve is equal to the straight line between those two points, the relationship between the average gradients in each of the first, second, third, fourth and fifth regions can be expressed in terms of the chord-wise positions of the tooth edge 14 at the tip point 16, the root point 18, and the chord-wise positions of the tooth edge 14 at a first intermediate point located 5% of the span-wise distance between tip point 16 and root point 18 and at a second intermediate point located 35% of the span-wise distance between tip point 16 and root point 18 and at a third intermediate point located 65% of the span-wise distance between tip point 16 and root point 18 and at a fourth intermediate point located 95% of the span-wise distance between tip point 16 and root point 18.

In FIG. 14 the difference in chord-wise extent of the tooth edge 14 between the first intermediate point (i.e. the 5% point) and the second intermediate point (i.e. the 35% point) is denoted by '$\Delta F1$' (in this instance '$\Delta$' does not denote $\ddot{k}_1 \hat{h}$ as in the mathematical analysis presented previously— instead '$\Delta F1$' as a whole denotes the different in chord-wise extent of the tooth edge between first and second intermediate points. The difference in chord-wise extent of the tooth edge 14 between the second intermediate point (i.e. the 35% point) and the third intermediate point (i.e. the 65% point) is denoted by '$\Delta F2$'. The difference in chord-wise extent of the tooth edge 14 between the third intermediate point (i.e. the 65% point) and the fourth intermediate point (i.e. the 95% point) is denoted by '$\Delta F3$'.

According to the analysis presented previously, it is desirable that the tip points and root points be non-smooth points, i.e. a sharp discontinuity in gradient. However, while such a tip point is possible mathematically, physical limitations such as manufacturing tolerances (it might not be possible to manufacture with such precision) and structural requirements (the tooth tip might be required to have a minimum thickness in order to provide sufficient stiffness or not break in use) mean that, in practice, the tip points and root points will have a finite thickness. Provided that the tip points and root points remain narrow relative to the 'hydrodynamic wavelength' of the turbulence ($|\ddot{U}|/\omega$), then non-sharp tip points and root points can be tolerated while still providing the benefits of the invention.

Therefore the properties of the tooth shape that provide reduced noise generation can be condensed into the following relationships: $\Delta F1 > \Delta F2$ and $\Delta F3 > \Delta F2$, provided there are no stationary points between the tip point 16 and root point 18.

The second tooth 8b of FIG. 14 is identical in shape to the first tooth 8a but has been annotated in a different fashion to demonstrate an alternative approach to characterizing the tooth edge profile. Two 2D shapes have been overlain using diagonal hatching. The first 2D shape is the region demarked by the chord-wise line 40 through the tip point 16 of the second tooth 8b, the span-wise line through the mid-point that is the point of the tooth edge 14 located at 50% of the span-wise distance between tip point 16 and root point 18 (given in this case by the base line 12), and the tooth edge profile from the tip point 16 to the mid-point. The location of the centroid of the first 2D shape is indicated in FIG. 14 by reference point 44. If the first 2D shape were triangular, as would be the case with a sawtooth serration profile, then the centroid would be located at ⅓ of the chord-wise distance from the mid-point to the tip point 16. But, due to the concave 2D shape, the chord-wise position of the centroid is less than ⅓ of the chord-wise distance from the mid-point to the tip point 16.

The second 2D shape is the region demarked by the chord-wise line 42 through the root point 18 of the second tooth 8b (shared with the first tooth 8a), the span-wise line through the mid-point that is the point of the tooth edge 14 located at 50% of the span-wise distance between tip point 16 and root point 18 (given in this case by the base line 12), and the tooth edge profile from the mid-point to the root point 18. The location of the centroid of the second 2D shape is indicated in FIG. 14 by reference point 46. If the second 2D shape were triangular, as would be the case with a sawtooth serration profile, then the centroid would be located at ⅓ of the chord-wise distance from the mid-point to the root point 18. But, due to the concave 2D shape, the chord-wise position of the centroid is less than ⅓ of the chord-wise distance from the mid-point to the root point 18.

By visual inspection, the concave first and second 2D shapes provide for a higher gradient (change in chord-wise position of the tooth edge with respect to span-wise position) in the neighbourhood of the tip points and root points, compared with the gradient further from the tip points and root points. If the 2D shapes were convex by contrast, then the chord-wise positions of the centroids would be more than ⅓ of the distance from the mid-point to tip point 16 or mid-point 18. Also, there would not be a higher gradient in the neighbourhood of the tip points and the root points compared with the gradient further from the tip points and root points.

Figure 15:
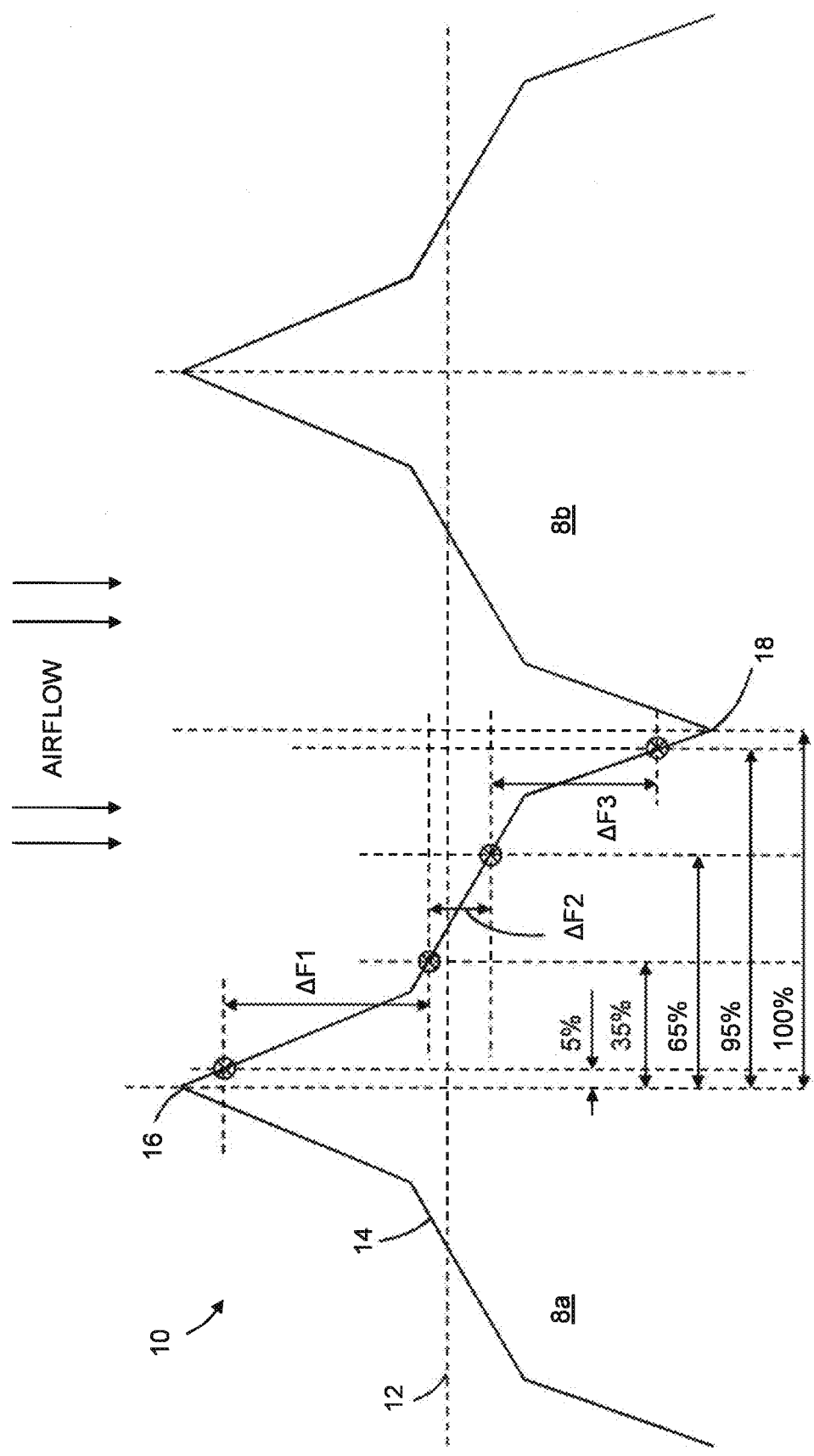
FIG. 15 illustrates a serrated portion of the leading edge of an aerofoil embodying an aspect of the disclosure, the edges of the teeth being formed of multiple piecewise linear portions.

FIG. 15 illustrates a further serrated portion 10 of the leading edge of an aerofoil embodying an aspect of the disclosure. In this case, the 'curve' of the tooth edge, including the inflection that results in concentrated 'sharpness' in the neighbourhoods of the tip points 16 and root points 18, is provided by a plurality of piecewise linear portions. In particular, the tooth edge curve between a tip point and a root point consists of three piecewise linear portions. The piecewise linear portion in the middle has a lower gradient than either of the piecewise linear portions adjacent to the tip point 16 or root point 18. Even if the neighbourhoods do not coincide with the 35% and 65% span-wise intermediate points the average gradient between two points on different piecewise linear portions of the 'curve' is provided by the straight-line gradient between the two points, for example, by locating second and third intermediate points on the tooth edge 14 between tip point 16 and root point 18 at 35% and 65% of the span-wise distance between the tip point 16 and root point 18—which are not in this case the edges of the piecewise linear portions. First and fourth intermediate points are located on the tooth edge 14 at 5% and 95% of the span-wise distance between tip point 16 and root point 18.

Again, the difference in chord-wise extent of the tooth edge 14 between the first intermediate point (i.e. the 5% point) and the second intermediate point (i.e. the 35% point) is denoted by $\Delta F1$. The difference in chord-wise extent of the tooth edge 14 between the second intermediate point (i.e. the 35% point) and the third intermediate point (i.e. the 65% point) is denoted by $\Delta F2$. The difference in chord-wise extent of the tooth edge 14 between the third intermediate point (i.e. the 65% point) and the fourth intermediate point (i.e. the 95% point) is denoted by $\Delta F3$. And again, $\Delta F1$ is greater than $\Delta F2$ and $\Delta F3$ is greater than $\Delta F2$. Thus it is demonstrated, using the same average-gradient approach as before, that the 'sharpness' is concentrated in the neighbourhoods of the tip points 16 and root points 18 (and there is no stationary point between first intermediate point (5% point) and fourth intermediate point (95% point), or indeed between tip point 16 and root point 18), that the conditions for the improved noise reduction are in place.

Unlike FIG. 14, FIG. 15 does not have 2D shapes overlain on the drawing of the second tooth 8b, but the 2D shapes between chord-wise lines through tip point 16 and root point 18, the span-wise line through the mid-point located on the tooth edge at 50% of the span-wise distance between tip point 16 and root point 18, and the tooth edge between tip point 16 and root point 18 of tooth 8b, can be seen by visual inspection to be 'concave' compared to the equivalent triangles that would be obtained for a straight line tooth edge profile as found in a sawtooth profile, and the chord-wise positions of the centroids would be located less than ⅓ of the distance from the span-wise line through the mid-point to the tip point 16 or root point 18 respectively.

Figure 16:
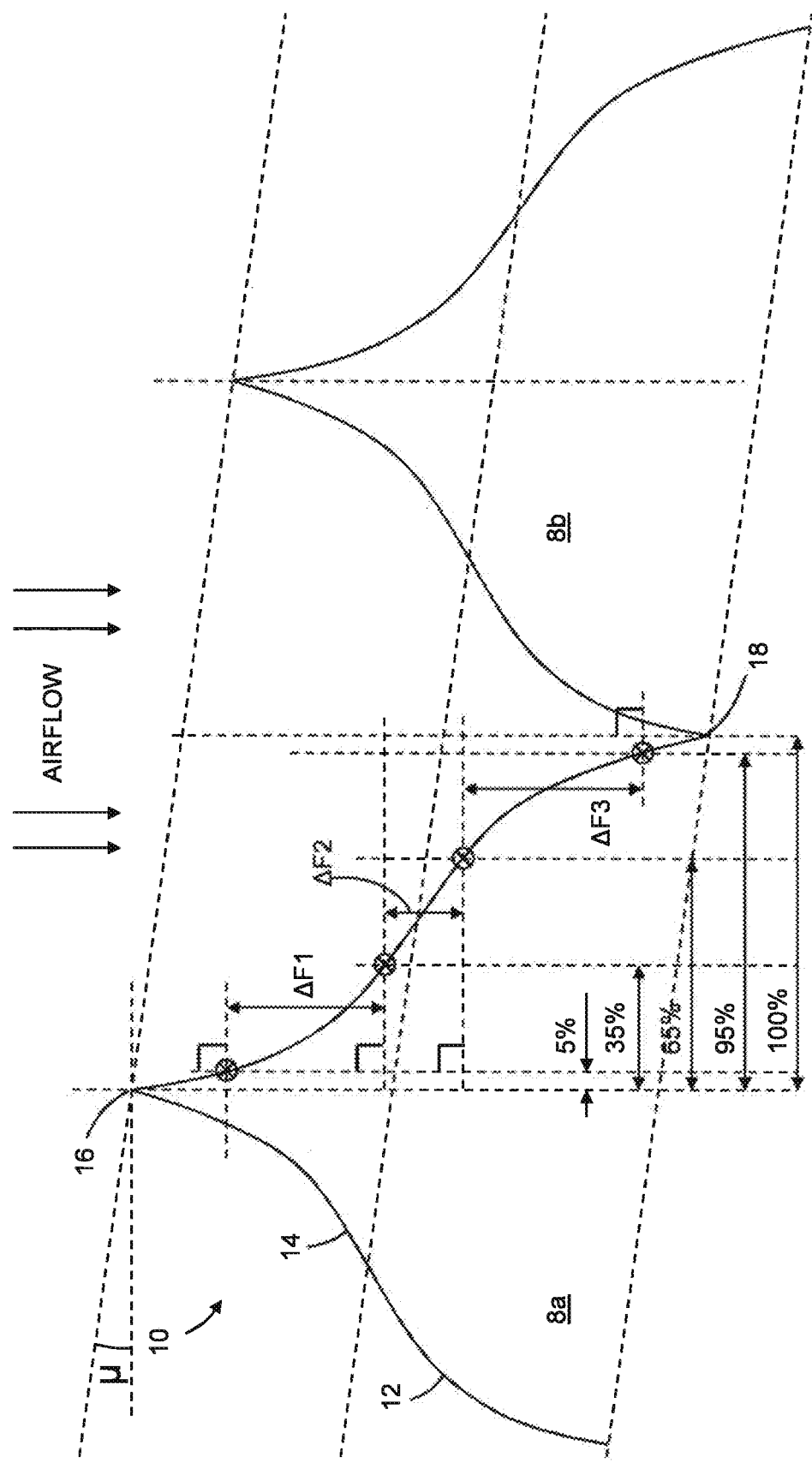
FIG. 16 illustrates a serrated portion of the leading edge of an aerofoil embodying an aspect of the disclosure, the leading edge being angled relative to the span-wise direction.

FIG. 16 illustrates a further serrated portion 10 of the leading edge of an aerofoil embodying an aspect of the disclosure. Unlike the aerofoils of FIGS. 14 and 15, the leading edge of the aerofoil is not perpendicular to the airflow direction. The baseline 12 that represents the leading edge in the absence of a serrated portion is angled relative to the span-wise direction that is perpendicular to the airflow (and the chord-wise direction). A leading edge that is angled relative to the span-wise direction is common in aerofoils, such as in swept wings. The angle is denoted in FIG. 16 by $\mu$, although its precise value is arbitrary. The teeth 8a, 8b follow the angled leading edge and are directed chord-wise so, unlike the teeth shown in FIGS. 14 and 15, the teeth are not symmetric about the chord-line that passes through a tip point 16. The chord-wise distance from the tip point 16 to a first root point 18 on one side is different to the chord-wise distance from the tip point 16 to a second root point 18 on the other side. This is due to the teeth being aligned with the chord-wise direction with the leading edge being non-perpendicular to the chord-wise direction, i.e. angled relative to the span-wise direction.

But, compared with a sawtooth serration profile, these teeth still concentrate 'sharpness' or steepness of chord-wise/span-wise gradient at the tip point 16 and root point 18.

This can be demonstrated by locating first, second, third and fourth intermediate points on the tooth edge 14 between tip point 16 and root point 18 at, respectively, 5%, 35%, 65% and 95% of the span-wise distance between the tip point 16 and root point 18. It can be confirmed again that the 'sharpness' is concentrated at the tip point 16 and root point 18 by considering the average gradients by way of the chord-wise positions of the tooth edge 14 at the first, second, third and fourth intermediate points.

Again, the difference in chord-wise extent of the tooth edge 14 between the first intermediate point (i.e. the 5% point) and the second intermediate point (i.e. the 35% point)

is denoted by ΔF1. The difference in chord-wise extent of the tooth edge 14 between the second intermediate point (i.e. the 35% point) and the third intermediate point (i.e. the 65% point) is denoted by ΔF2. The difference in chord-wise extent of the tooth edge 14 between the third intermediate point (i.e. the 65% point) and the fourth intermediate point (i.e. the 95% point) is denoted by ΔF3. And again, ΔF1 is greater than ΔF2 and ΔF3 is greater than ΔF2.

Since the gradients in the neighbourhoods of the tip point 16 and the root point 18, represented by ΔF1 and ΔF3, are higher than elsewhere, the gradient or 'sharpness' is still focused at the tip points and root points (non-smooth points) and so the serrations would provide the increase noise reduction since the analysis and experimental results set out above, while provided for aerofoils with leading edges normal to the flow direction, i.e. parallel to the span-wise direction, is not restricted to such configurations.

FIG. 16 also does not have 2D shapes overlain on the drawing of the second tooth 8b, but the 2D shapes between chord-wise lines through tip point 16 and root point 18, the span-wise line through the mid-point located on the tooth edge at 50% of the span-wise distance between tip point 16 and root point 18, and the tooth edge between tip point 16 and root point 18 of tooth 8b, can be seen by visual inspection to be 'concave' compared to the equivalent triangles that would be obtained for a straight line tooth edge profile as found in a sawtooth profile, and the chord-wise positions of the centroids would be located less than ⅓ of the distance from the span-wise line through the mid-point to the tip point 16 or root point 18 respectively.

Figure 17:
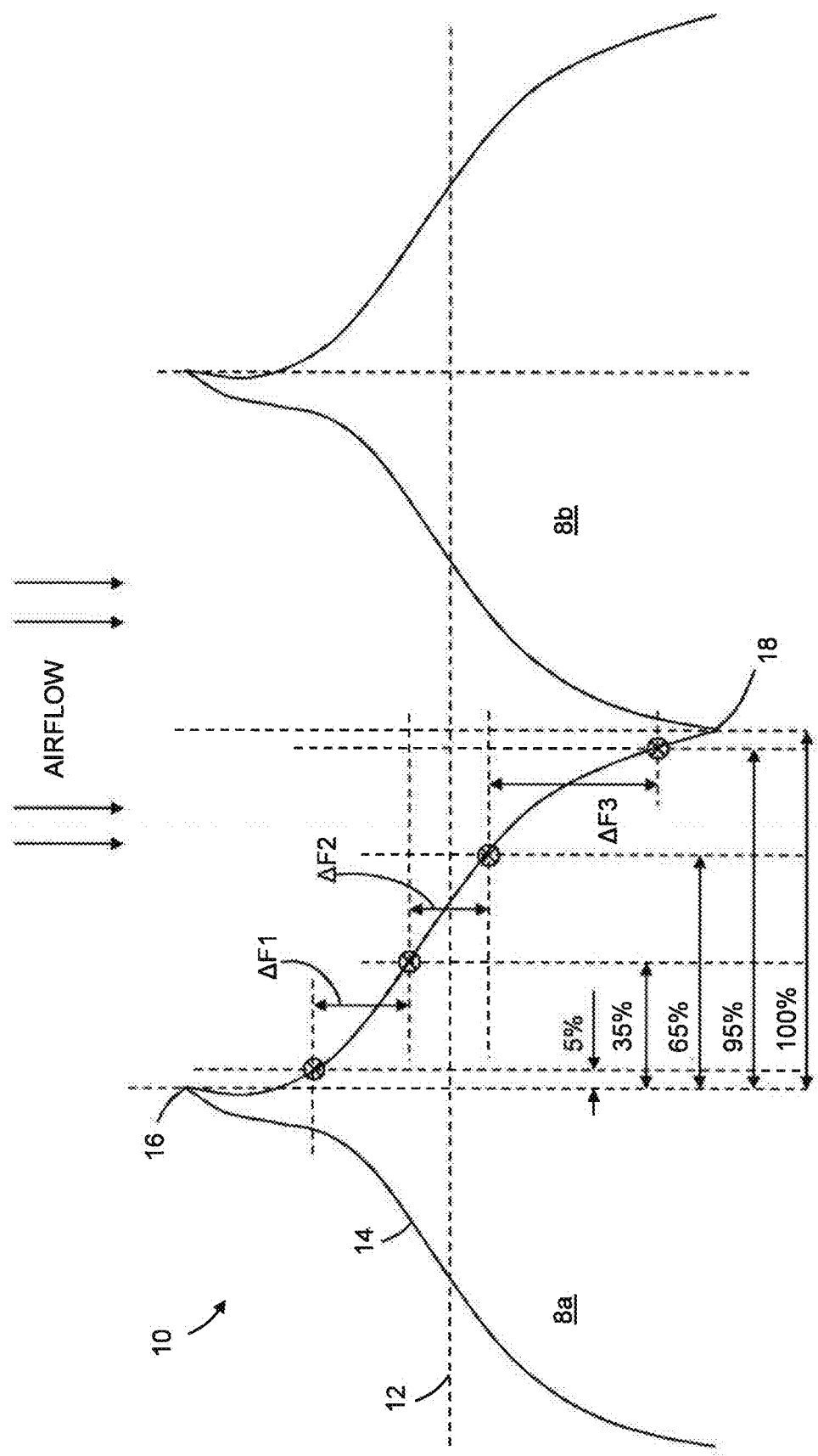
FIG. 17 illustrates a serrated portion of the leading edge of an aerofoil embodying an aspect of the disclosure, the teeth having hooked tips.

FIG. 17 illustrates a further serrated portion 10 of the leading edge of an aerofoil embodying an aspect of the disclosure. Unlike the serrations shown in FIGS. 14 to 16, the tip points 16 are shown to be 'hook-like'. If chord-wise value of the tooth-edge position were a function of span-wise location, then such a function would not be single valued for the hook-like tip points 16 of the aerofoil shown in FIG. 17. The upstream end of the hook shelters a portion of the tooth edge from the airflow.

The mathematical analysis set out above was prepared on the basis that the function F(y) defining the shape of the serration was single valued. This means that the aerofoil is strictly outside of the scope of the analysis. Nonetheless, it is believed based on physical intuition that such an aerofoil leading edge profile would still provide the increased noise reduction.

Even though the curve function that defines the tooth edge 14 is not single-valued, the average gradient is still provided by the straight-line gradient between two points on the curve. The intermediate points located at 5%, 35%, 65% and 95% of the span-wise distance between tip point 16 and root point 18 can still be obtained, and difference values ΔF1, ΔF2 and ΔF3 obtained to demonstrate that the 'sharpness' is concentrated at the tip points 16 and root points 18.

Figure 18:
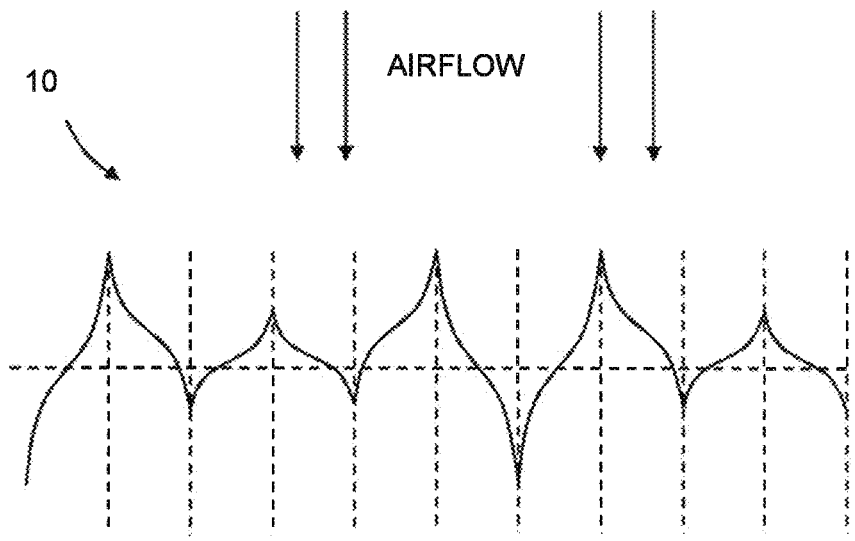
FIG. 18 illustrates a serrated portion of the leading edge of an aerofoil embodying an aspect of the disclosure, the chord-wise positions of tip points and root points varying span-wise from tooth to tooth.

FIG. 18 illustrates a further serrated portion 10 of the leading edge of an aerofoil embodying an aspect of the disclosure. Some of the teeth are not symmetric about the chord-wise line passing through tip points. Also the tooth edge profile from root point to tip point of adjacent teeth is not symmetric about shared root points, at least for some of the teeth. Symmetry is not a requirement. The teeth shown in FIG. 18 all have the same span-wise width from root point to tip point to root point. The teeth shown in FIG. 18 all also have the same half-width from tip point to root point either side. But the chord-wise extent of each tip point relative to the leading edge base line varies from tooth to tooth, as does the chord-wise extent of each root point. Some teeth are longer and some teeth are shorter. FIG. 18 is not annotated to show the intermediate points located at 5%, 35%, 65%, 95% span-wise between tip points and root points but, by straightforward inspection the tooth edges follow ogee-like curves between tip point and root point and so the 'sharpness' is concentrated at tip points and root points across all teeth shown in FIG. 18.

Figure 19:
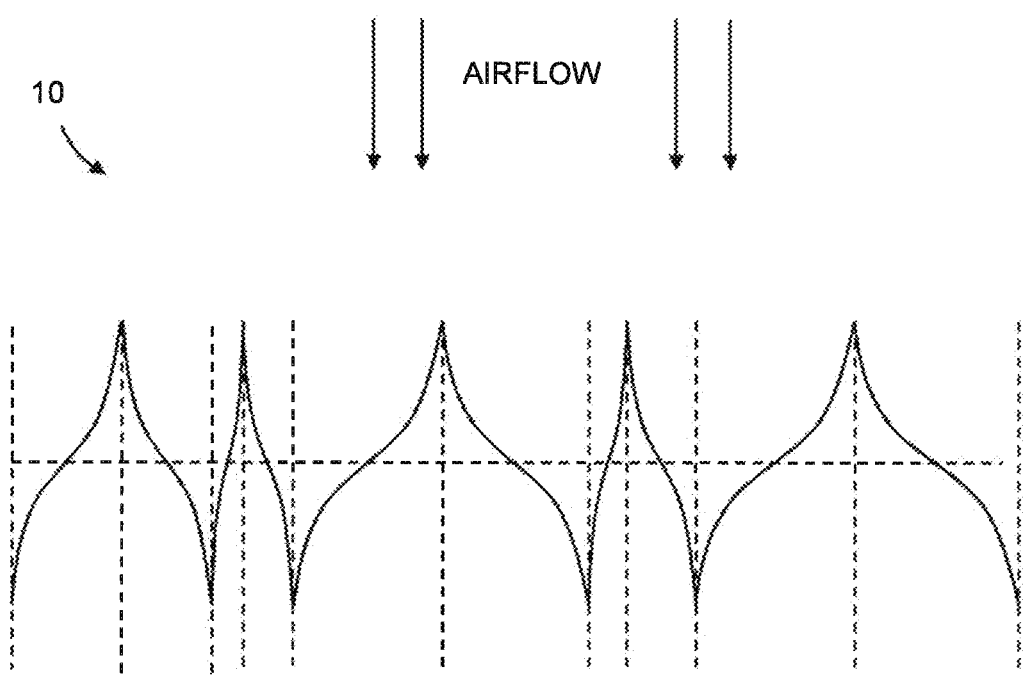
FIG. 19 illustrates a serrated portion of the leading edge of an aerofoil embodying an aspect of the disclosure, the span-wise widths of teeth varying span-wise from tooth to tooth.

FIG. 19 illustrates a further serrated portion 10 of the leading edge of an aerofoil embodying an aspect of the disclosure. Some of the teeth are not symmetric about the chord-wise line passing through tip points. Also the tooth edge profile from root point to tip point of adjacent teeth is not symmetric about shared root points, at least for some of the teeth. Symmetry is not a requirement. The teeth shown in FIG. 19 all have different span-wise widths from root point to tip point to root point from each other. The teeth shown in FIG. 19 also do not all have the same half-width from tip point to root point either side. But the chord-wise extent of each tip point relative to the leading edge base line does not vary from tooth to tooth among these teeth. Also the chord-wise extent of each root point does not vary from tooth to tooth among these teeth.

In other embodiments, the chord-wise distance between the shared root point at which two adjacent teeth adjoin and the tip point of a first tooth is close to the chord-wise distance between the shared root point and the tip point of a second tooth of the two adjacent teeth, e.g. within 20%, in some embodiments within 15%, in some embodiments within 10%, in some embodiments within 5%, in some embodiments within 4%, in some embodiments within 3%, in some embodiments within 2%, in some embodiments within 1%, in some embodiments within 0.5%. This relationship of similarity of tooth lengths may be replicated (for any of the above percentages) across some or all of the teeth of the serrated portion of the aerofoil. For example, in some embodiments all of the teeth in the serrated portion may have the same length chord-wise from root point to tip point.

Figure 20:
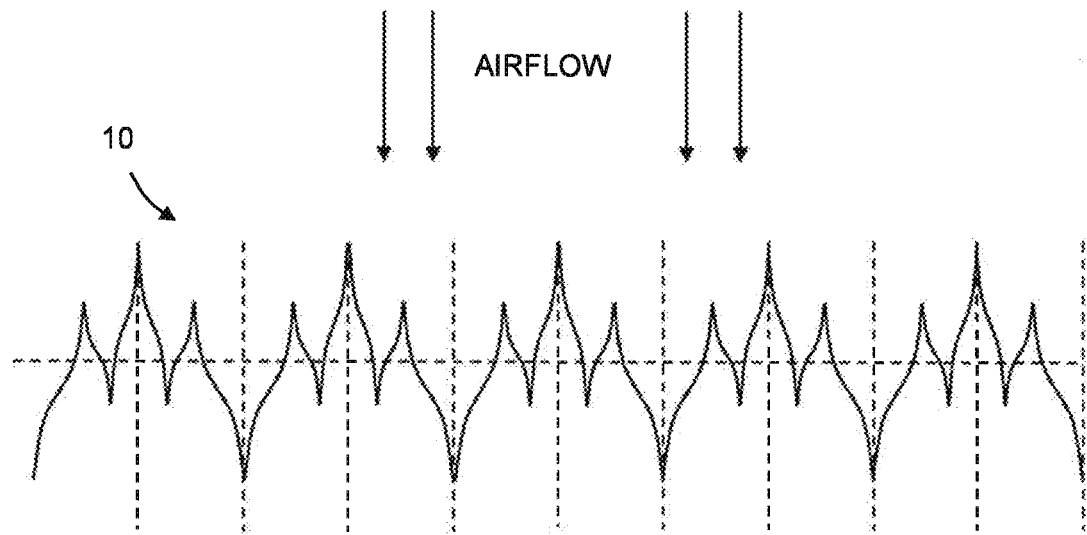
FIG. 20 illustrates a serrated portion of the leading edge of an aerofoil embodying an aspect of the disclosure, the span-wise widths of teeth and teeth heights varying periodically.

FIG. 20 illustrates a further serrated portion 10 of the leading edge of an aerofoil embodying an aspect of the disclosure. The embodiment of FIG. 20 differs from that of FIG. 19 in that the 'miniature' version of the tooth is superimposed onto either side of the main tooth. This may be viewed as the inclusion of a 'harmonic', in this case a third harmonic, of the basic tooth-shape waveform of this serrated portion. In other embodiments, other harmonics of the tooth shape waveform are superimposed onto a main, or 'fundamental', tooth shape waveform, including multiple harmonics. In one embodiment a second harmonic is superimposed onto a main, or 'fundamental', tooth shape wave form. This means that tip-point location alternates between two positions between adjacent teeth, one more upstream or 'leading' than the other, and root point location alternates between two positions between adjacent teeth, one more upstream or 'leading' than the other. Noise reduction is still provided due to the ogee-like curves concentrating 'sharpness' at the root points and tip points and due to their being no stationary point between root points and tip points in the tooth edge profiles.

Figure 21:
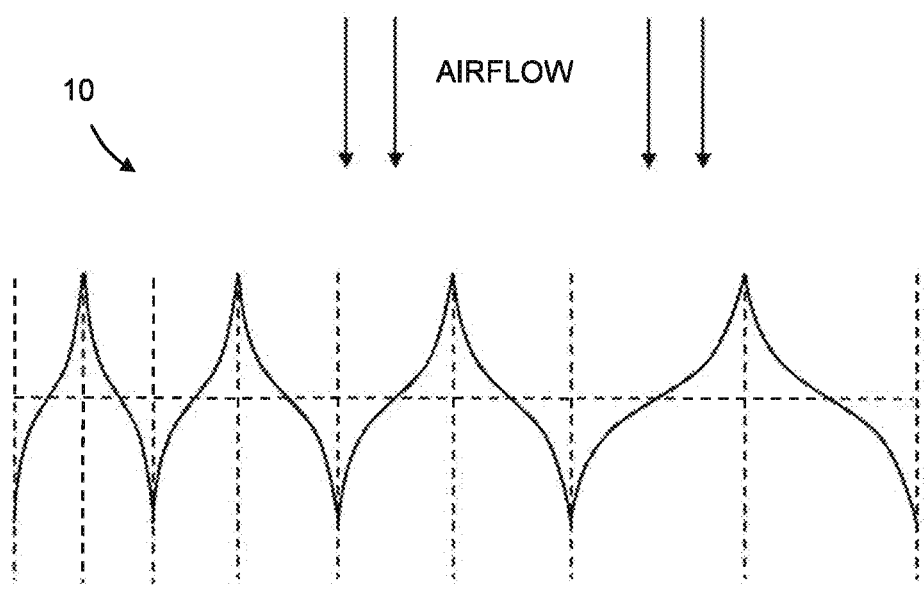
FIG. 21 illustrates a serrated portion of the leading edge of an aerofoil embodying an aspect of the disclosure, the span-wise widths of teeth varying monotonically.

FIG. 21 illustrates a further serrated portion 10 of the leading edge of an aerofoil embodying an aspect of the disclosure. In this embodiment the span-wise width of teeth increases (with monotonicity) across the leading edge of the aerofoil. This embodiment may be particular advantageous in rotary applications, such as on a wind turbine blade, where the air stream velocity varies across the blade, typically from a minimum at the hub to a maximum at the blade tip. In such applications the wavelength can be tuned to the particular air velocity expected at that location along the leading edge.

In other embodiments, the span-wise widths of the teeth vary across the leading edge and the heights of the teeth vary across the leading edge. Both may vary aperiodically or monotonically. In some embodiments, both tooth width and tooth height is varied across the span, with the ratio of tooth width to tooth height remaining constant or remaining within a range.

Figure 22:
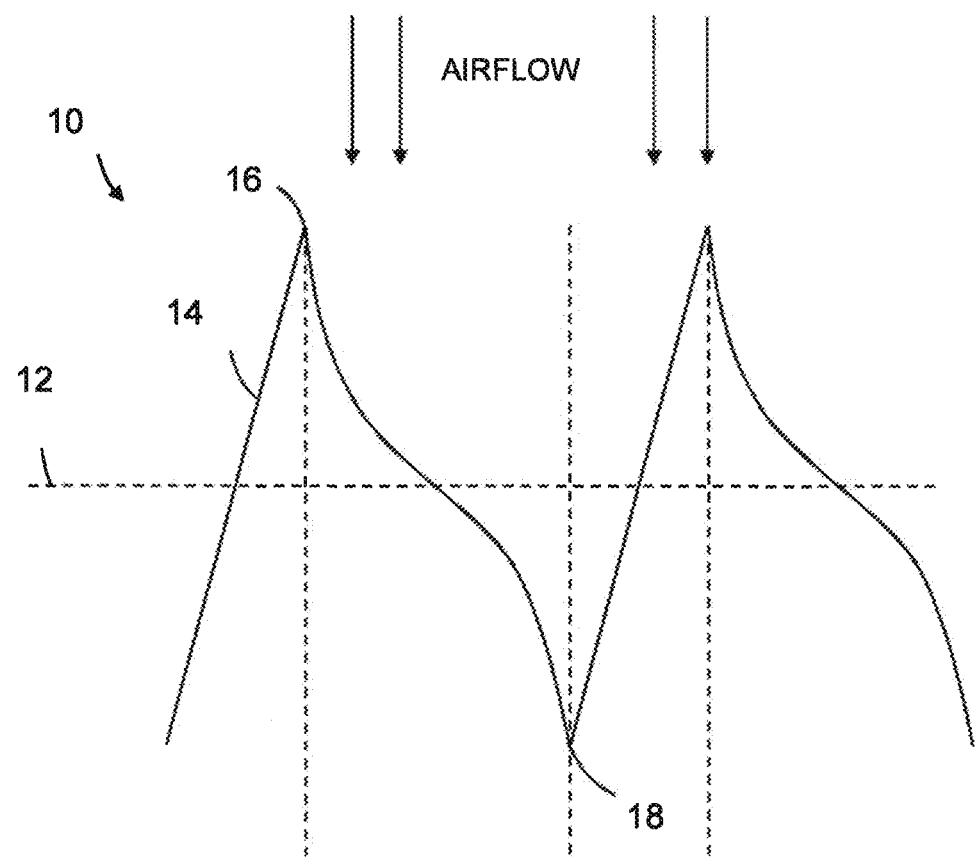
FIG. 22 illustrates a serrated portion of the leading edge of an aerofoil embodying an aspect of the disclosure, the teeth having a mix of straight line edges and ogee-shaped edges from tip point to root point.

FIG. 22 illustrates a further serrated portion 10 of the leading edge of an aerofoil embodying an aspect of the disclosure. In this embodiment the tooth edge profiles include a mixture of straight-line profiles from tip point 16 to root point 18 and ogee-like curves from tip point 16 to root point 18. On the straight-line portions of the tooth edge, the 'sharpness' is not focused at the tip point 16 and root point 18 because the gradient is constant. This may mean that the effectiveness of the noise reduction is not as much as might be obtained if 'sharpness' were as per the ogee-like curved tooth edge profiles. But it is believed that some improvement in noise reduction may still be obtained.

Figure 23:
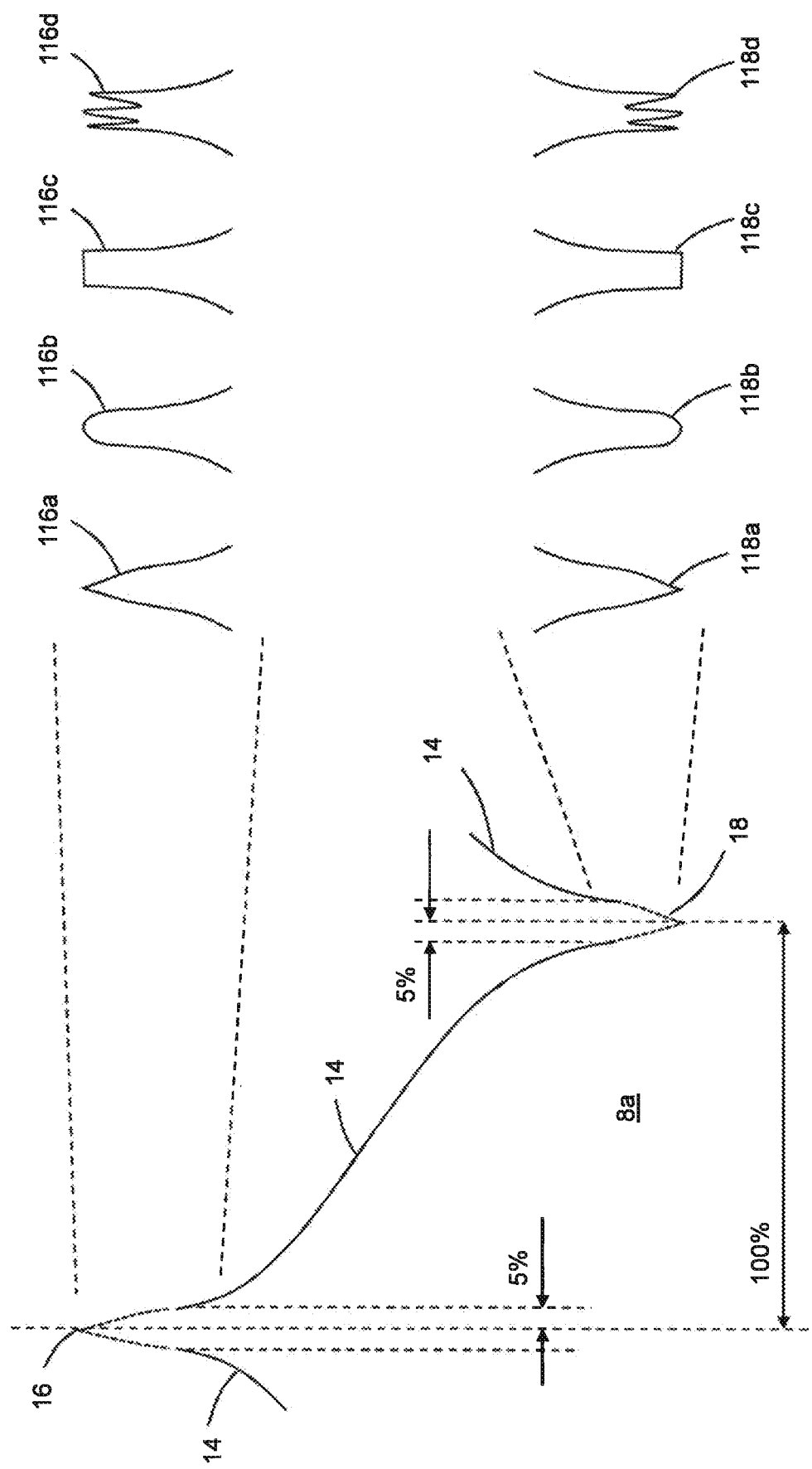
FIG. 23 illustrates a tooth edge profile embodying an aspect of this disclosure with multiple variant tip point and root point shapes.

FIG. 23 illustrates a tooth edge 14 of a tooth 8a, wherein the precise forms of the tip point 16 and root point 18 are not specified precisely in the region between the tip point 16 and the 5% intermediate position and the 95% intermediate position and the root point 18—they are shown with dashed lines. On the right-hand side of FIG. 23 there are shown example tip point profiles and example root point profiles. Tip point 116a is somewhat triangular and sharpens to a point. Tip point 116b presents a smooth curve across the tip approximately in the form of a semicircle. Tip point 116c presents a blunt tip point. The tip is flat or substantially flat. A local maximum chord-wise position may still be defined but may be shared by multiple span-wise locations. In such cases, the span-wise location of the tip point may be considered the span-wise centre of the flat region that is the local maximum chord-wise position. Tip point 116d presents a jagged or zigzagging tip point. In the cases of tip points 116b, 116c, and 116d, the tip point includes a stationary point. But, provided the width of the tip point is sufficiently narrow, noise reduction may still be obtained. Root points 118a-d are identical to the corresponding tip points 116a-d.

Some embodiments comprise a serrated region comprising multiple teeth, in which the tip and root points all have the same form, which may be any of 116a-d and 118a-d. In other embodiments, the forms of the tip points and root points are not constant across the serrated region and vary from tooth to tooth. In other embodiments, the intermediate positions define tip point and root point half widths—in which the profile is not specified precisely and, e.g. the sharpness and no-stationary-points criteria are relaxed, are at 0.5%, 1%, 2%, 3%, 4%, 6%, 7%, 8%, 9%, or 10% of the span-wise distance between tip point and root point, and any of tip points 116a-d and 118a-d (for example) describe the shape of tip points and root points.

While the above-described embodiments feature serrated regions on leading edges of foils, the analysis and experimental results set out above are believed to hold also for the selection of serration profiles for trailing edges of foils. Thus any of the above-described geometries as illustrated in FIGS. 14 to 23 may alternatively or additionally be located on the trailing edge of a foil.

Figure 24:
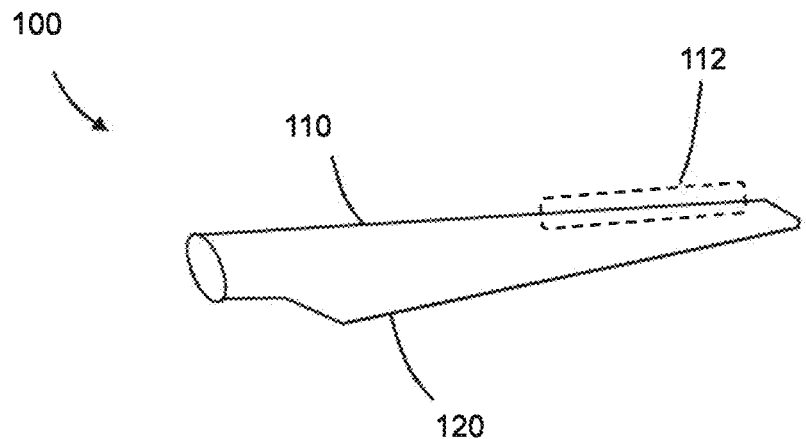
FIG. 24 illustrates a wind turbine blade embodying an aspect of this disclosure.

FIG. 24 illustrates an aerofoil embodying an aspect of the disclosure. In this case the aerofoil is a wind turbine blade 100, having a leading edge 110 and a trailing edge 120. A serrated region 112 is provided on the leading edge 110 but not on the trailing edge. Advantageously, the serrated region 112 is located at or at least close to the tip end of the wind turbine blade 100 because, in operation, higher air velocities would be expected at the tip end, which may contribute to a greater need for noise reduction.

Figure 25:
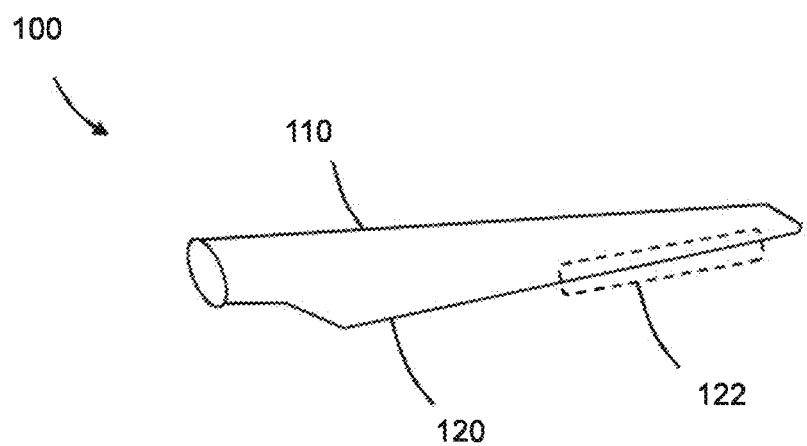
FIG. 25 illustrates a wind turbine blade embodying an aspect of this disclosure.

FIG. 25 illustrates a further aerofoil embodying an aspect of the disclosure. The aerofoil is a wind turbine blade 100, having a leading edge 110 and a trailing edge 120. A serrated region 122 is provided on the trailing edge 120 but not on the leading edge 110.

Figure 26:
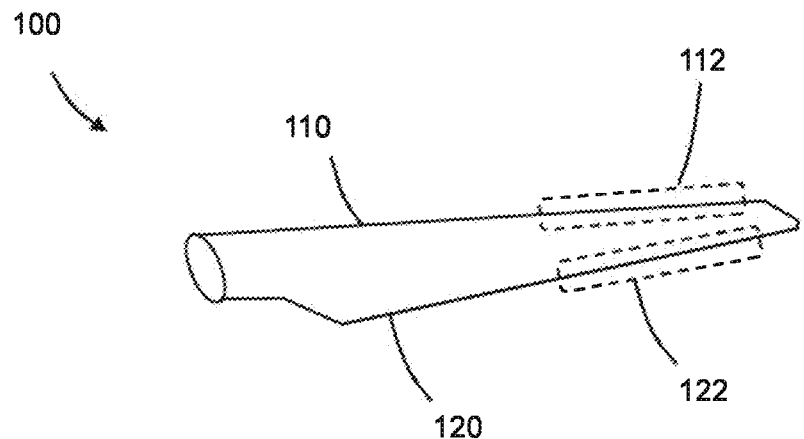
FIG. 26 illustrates a wind turbine blade embodying an aspect of this disclosure.

FIG. 26 illustrates a further aerofoil embodying an aspect of the disclosure. The aerofoil is a wind turbine blade 100, having a leading edge 110 and a trailing edge 120. A serrated region 112 is provided on the leading edge 110 and a further serrated region 122 is provided on the trailing edge 120.

Figure 27:
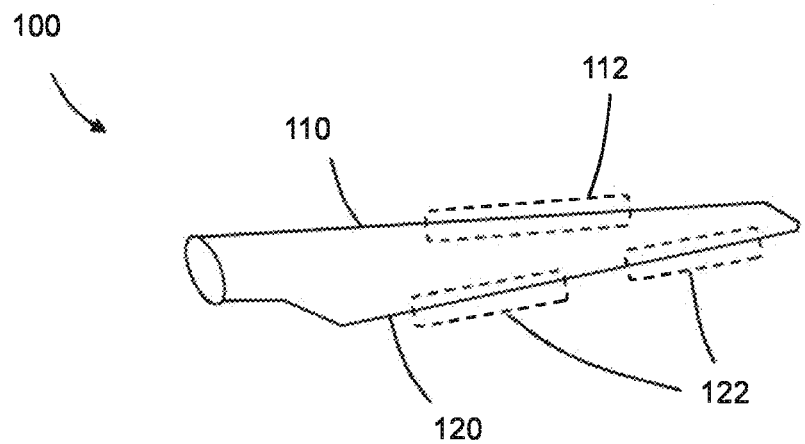
FIG. 27 illustrates a wind turbine blade embodying an aspect of this disclosure.

FIG. 27 illustrates a further aerofoil embodying an aspect of the disclosure. The aerofoil is a wind turbine blade 100, having a leading edge 110 and a trailing edge 120. A serrated region 112 is provided on the leading edge 110 and two serrated regions 122 are provided on the trailing edge 120.

The techniques of this disclosure include the provision of foil, such as an aerofoil, having a leading edge and a trailing edge, of which at least a portion of one or both of the leading edge and trailing edge has a serrated profile comprising a plurality of adjoining teeth, each tooth having a tip point that represents a local maximum chord-wise extent of the tooth and, on each side span-wise of the tip point, a root point that represents a local minimum chord-wise extent of the tooth and at which the tooth adjoins a respective adjacent tooth, wherein the tooth edge profile varies with an ogee-like curve between tip point and root point such that the tooth is sharper in the neighbourhood of the tip point and in the neighbourhood of the root point than at locations in between.

The techniques of this disclosure include the manufacture of such a foil by attaching a noise-reduction device as described herein to a leading or trailing edge of a foil.

Noise reduction devices according to the techniques of this disclosure comprise a serrated profile for attachment at a leading or trailing edge of a foil, and may be attached to the foil by any constructional technique that would be apparent to the skilled reader according to the particular application and the environment in which the foil operates.

Aspects of this disclosure may further be embodied by an aerofoil of a gas turbine engine, including a rotor blade, a stator blade, an outlet guide vane, having leading edge serrations or trailing edge serrations or both leading and trailing edge serrations according to one or more of the above-described serration profiles, or embodying the noise-reduction principles set out above. One example is a propfan or open-rotor engine, in which a turbine features contra-rotating fan stages that are not enclosed within a casing.

Aspects of this disclosure may further be embodied by a nacelle for holding an aero engine, the nacelle having a generally tubular shape with serrated leading or trailing edges. In such cases, a serrated region as described herein may extend substantially all around the circumference of the leading edge or trailing edge of the nacelle. As with a closed wing, for example, a span-wise direction represents a circumferential direction.

Aspects of this disclosure may further be embodied by an aerofoil, or wing, of a fixed-wing aircraft, the wing being provided with a serrated region as described herein on its leading edge, trailing edge, or both leading and trailing edge.

Aspects of this disclosure may further be embodied by a rotary wing aircraft, having blades including leading edge serrations or trailing edge serrations or both leading and trailing edge serrations according to one or more of the above-described serration profiles, or embodying the noise-reduction principles set out above. For example, serrations may be provided on one or both of leading and trailing edges of a helicopter tail rotor.

Aspects of this disclosure may further be embodied by a hydrofoil, or lifting surface for use in water, of a watercraft, or alternatively as a hydroplane such as a diving plane. The hydrofoil or hydroplane may be provided with a serrated region as described herein on its leading edge, trailing edge, or both leading and trailing edge.

Aspects of this disclosure may further be embodied by water turbine machinery including a turbine blade for a water turbine being provided with a serrated region as described herein on its leading edge, trailing edge, or both leading and trailing edge.

Aspects of this disclosure may further be embodied by propellers and particularly marine propellers including a blade being provided with a serrated region as described herein on its leading edge, trailing edge, or both leading and trailing edge.

Aspects of this disclosure may further be embodied by fans and blowers, such as a ceiling fan, an HVAC fan, a cooling fan for electrical equipment such as a computer, with fan blades having leading and trailing edges, with a serrated region as described herein being provided on the leading edge, trailing edge or both leading edge and trailing edge. In some embodiments such fans are axial fans. In other embodiments such fans are centrifugal fans. In other embodiments such fans are cross-flow fans.

Some embodiments have been described. These embodiments are presented by way of example only and are not intended to limit the scope of the disclosure. Indeed, the novel methods, apparatus and systems described herein may be embodied in a variety of other forms. It should be apparent to those skilled in the art that many more modifications besides those already described are possible without departing from the inventive concepts herein. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A foil having a leading edge and a trailing edge, of which at least a portion of one or both of the leading edge and trailing edge has a serrated profile comprising a plurality of adjoining teeth, each tooth having a tip point that represents a local maximum chord-wise extent of the tooth, a root point, on each side span-wise of the tip point, that represents a local minimum chord-wise extent of the tooth and at which the tooth adjoins a respective adjacent tooth so that the root point is shared by the tooth and the respective adjacent tooth, and a tooth edge, on each side span-wise of the tip point, between the tip point and an adjacent root point, wherein the profile of the tooth edge between the tip point and an adjacent root point is subject to a limitation, the limitation being defined by relative chord-wise positions of the tooth edge at first, second, third and fourth intermediate positions located respectively at 5%, 35%, 65% and 95% of a span-wise distance from the tip point to the root point, a chord-wise distance between the second and third intermediate positions being less than the chord-wise distance between the first and second intermediate positions and the chord-wise distance between the second and third intermediate positions being less than the chord-wise distance between the third and fourth intermediate positions, and wherein the profile of the tooth edge between the tip point and the adjacent root point is subject to a further limitation in that a tangent to the tooth edge is not perpendicular to a chord-wise direction at any location on the tooth edge between the first intermediate position and the fourth intermediate position.

2. The foil of claim 1, wherein the leading edge or/and the trailing edge has a serrated profile.

3. The foil of claim 1, wherein the profile of the tooth edge varies on a smooth path between the first intermediate position and the fourth intermediate position such that gradient of chord-wise position of the tooth edge with respect to span-wise position of the tooth edge is continuous between the first intermediate position and the fourth intermediate position.

4. The foil of claim 1, wherein one or both of the tip point and root point is blunt, having a region in which the tangent to the tooth edge is perpendicular to the chord-wise direction.

5. The foil of claim 1, wherein the span-wise position of the tooth edge between first intermediate position and the fourth intermediate position varies as a sigmoidal function of the chord-wise position of the tooth edge.

6. The foil of claim 1, wherein the profile of the tooth edge between the first intermediate position and fourth intermediate position is ogee-shaped having an inflection point at which the tangent is not perpendicular to the chord-wise direction.

7. The foil of claim 1, wherein the chord-wise distance between the shared root point of two adjacent teeth and the tip point of a first tooth of the two adjacent teeth is the same as or within 5% of the chord-wise distance between the shared root point and the tip point of a second tooth of the two adjacent teeth.

8. The foil of claim 1, wherein the chord-wise position of the tooth edge between tip point and root point varies as a single-valued function of the span-wise position of the tooth edge.

9. The foil of claim 1, wherein the profile of the tooth edge between the first intermediate position and a position of the tooth edge located at a mid-point between the first and fourth intermediate positions has rotational symmetry with the profile of the tooth edge between the mid-point and the fourth intermediate position, wherein preferably the profile of the tooth edge between the tip point and the position of the tooth edge located at the mid-point has rotational symmetry with the profile of the tooth edge between the mid-point and the root point.

10. The foil of claim 1, wherein each tooth of the plurality of adjoining teeth of the serrated profile has a same span-wise width or a span-wise width within 20% a mean span-wise width of the plurality of adjoining teeth.

11. The foil of claim 1, wherein span-wise widths of the adjoining teeth of the serrated profile vary across the serrated profile.

12. The foil of claim 1, wherein lengths of teeth, defined as a chord-wise distance from the tip point of a tooth to the average chord-wise position of the root points of the tooth, vary across the serrated profile.

13. The foil of claim 1, wherein a ratio of the chord-wise distance between the tip point and the root point to the span-wise distance between the tip point and root point is greater than 0.5.

14. An apparatus comprising one or more foils according to claim 1, wherein the apparatus is one of:

a turbomachine;
an aircraft;
a watercraft; and
a cooling fan.

15. The foil of claim 1, wherein a ratio of the chord-wise distance between the tip point and the root point to the span-wise distance between the tip point and root point is greater than 2.5.

16. The foil of claim 1, wherein a ratio of the chord-wise distance between the tip point and the root point to the span-wise distance between the tip point and root point is greater than 10.

17. A noise-reduction device having a serrated profile for attachment at a leading or trailing edge of a foil, the serrated profile comprising a plurality of adjoining teeth, each tooth having a tip point that represents a local maximum chord-wise extent of the tooth, a root point, on each side span-wise of the tip point, that represents a local minimum chord-wise extent of the tooth and at which the tooth adjoins a respective adjacent tooth so that the root point is shared by the tooth and the respective adjacent tooth, and a tooth edge, on each side span-wise of the tip point, between the tip point and an adjacent root point,
wherein the profile of the tooth edge between the tip point and an adjacent root point is subject to a limitation, the limitation being defined by relative chord-wise positions of the tooth edge at first, second, third and fourth intermediate positions located respectively at 5%, 35%, 65% and 95% of a span-wise distance from the tip point to the root point, a chord-wise distance between the second and third intermediate positions being less than the chord-wise distance between the first and second intermediate positions and the chord-wise distance between the second and third intermediate positions being less than the chord-wise distance between the third and fourth intermediate positions, and
wherein the profile of the tooth edge between the tip point and the adjacent root point is subject to a further limitation in that a tangent to the tooth edge is not perpendicular to a chord-wise direction at any location on the tooth edge between the first intermediate position and the fourth intermediate position.

18. The noise reduction device of claim 17, wherein the noise reduction device is configured to be attached to a leading edge of a foil, or wherein the noise reduction device is configured to be attached to a trailing edge of a foil.

19. The noise reduction device of claim 17, wherein the profile of the tooth edge varies on a smooth path between the first intermediate position and the fourth intermediate position such that gradient of chord-wise position of the tooth edge with respect to span-wise position of the tooth edge is continuous between the first intermediate position and the fourth intermediate position.

20. The noise reduction device of claim 17, wherein one or both of the tip point and root point is blunt, having a region in which the tangent to the tooth edge is perpendicular to the chord-wise direction.

21. The noise reduction device of claim 17, wherein the span-wise position of the tooth edge between first intermediate position and the fourth intermediate position varies as a sigmoidal function of the chord-wise position of the tooth edge.

22. The noise reduction device of claim 17, wherein the profile of the tooth edge between the first intermediate position and fourth intermediate position is ogee-shaped having an inflection point at which the tangent is not perpendicular to the chord-wise direction.

23. The noise reduction device of claim 17, in which the chord-wise distance between the shared root point of two adjacent teeth and the tip point of a first tooth of the two adjacent teeth is the same as or within 5% of the chord-wise distance between the shared root point and the tip point of a second tooth of the two adjacent teeth.

24. The noise reduction device of claim 17, wherein the chord-wise position of the tooth edge between the tip point and the root point varies as a single-valued function of the span-wise position of the tooth edge.

25. The noise reduction device of claim 17, wherein the profile of the tooth edge between the first intermediate position and a position of the tooth edge located at a mid-point between the first and fourth intermediate positions has rotational symmetry with the profile of the tooth edge between the mid-point and the fourth intermediate position, wherein preferably the profile of the tooth edge between the tip point and the position of the tooth edge located at the mid-point has rotational symmetry with the profile of the tooth edge between the mid-point and the root point.

26. The noise reduction device of claim 17, wherein each tooth of the plurality of adjoining teeth of the serrated profile has a same span-wise width or a span-wise width within 20% of a mean span-wise width of the plurality of adjoining teeth.

27. The noise reduction device of claim 17, wherein span-wise widths of the adjoining teeth of the serrated profile vary across the serrated profile.

28. The noise reduction device of claim 17, wherein lengths of teeth, defined as the chord-wise distance from the tip point of a tooth to the average chord-wise position of the root points of the tooth, vary across the serrated profile.

29. The noise reduction device of claim 17, wherein a ratio of the chord-wise distance between the tip point and the root point to the span-wise distance between the tip point and root point is greater than 0.5.

30. The noise reduction device of claim 17, wherein a ratio of the chord-wise distance between the tip point and the root point to the span-wise distance between the tip point and root point is greater than 2.5.

31. The noise reduction device of claim 17, wherein a ratio of the chord-wise distance between the tip point and the root point to the span-wise distance between the tip point and root point is greater than 10.

* * * * *